(12) United States Patent
Nagata et al.

(10) Patent No.: US 8,488,528 B2
(45) Date of Patent: Jul. 16, 2013

(54) USER EQUIPMENT AND CELL SEARCH METHOD

(75) Inventors: Satoshi Nagata, Yokosuka (JP);
Yoshihisa Kishiyama, Yokosuka (JP);
Motohiro Tanno, Yokohama (JP);
Mamoru Sawahashi, Yokohama (JP)

(73) Assignee: NTT Docomo, Inc., Tokyo (TW)

( * ) Notice: Subject to any disclaimer, the term of this patent is extended or adjusted under 35 U.S.C. 154(b) by 293 days.

(21) Appl. No.: 13/058,589

(22) PCT Filed: Aug. 7, 2009

(86) PCT No.: PCT/JP2009/063995
§ 371 (c)(1),
(2), (4) Date: Apr. 27, 2011

(87) PCT Pub. No.: WO2010/018787
PCT Pub. Date: Feb. 18, 2010

(65) Prior Publication Data
US 2011/0207457 A1      Aug. 25, 2011

(30) Foreign Application Priority Data
Aug. 11, 2008 (JP) ................................. 2008-207484

(51) Int. Cl.
*H04W 4/00* (2009.01)
*H04J 3/06* (2006.01)
*H04J 11/00* (2006.01)

(52) U.S. Cl.
USPC ............ 370/328; 370/208; 370/350; 455/434

(58) Field of Classification Search
None
See application file for complete search history.

(56) References Cited

U.S. PATENT DOCUMENTS

| 7,272,376 B1 * | 9/2007 | Sparr et al. ............. 455/342 |
| 7,577,115 B2 * | 8/2009 | Jang ..................... 370/320 |
| 7,630,730 B2 * | 12/2009 | Becker et al. ............ 455/522 |
| 2002/0044538 A1 * | 4/2002 | Lee ...................... 370/332 |
| 2003/0193926 A1 * | 10/2003 | Lindoff et al. ............ 370/350 |

(Continued)

FOREIGN PATENT DOCUMENTS

| JP | 2002-118496 A | 4/2002 |
| JP | 2002-141886 A | 5/2002 |

(Continued)

OTHER PUBLICATIONS

Japanese Office Action for Application No. 2008-207484, mailed on Aug. 21, 2012 (4 pages).

(Continued)

*Primary Examiner* — Clemence Han
(74) *Attorney, Agent, or Firm* — Osha Liang LLP

(57) ABSTRACT

User equipment for performing cell search using a synchronization channel including a primary synchronization channel and a secondary synchronization channel includes a reception unit configured to receive a signal including the synchronization channel, a symbol timing candidate detection unit configured to detect multiple synchronization signal symbol timing candidates from the synchronization channel based on a correlation value in a time domain between the signal received at the reception unit and a replica signal of the primary synchronization channel, a secondary synchronization channel correlation detection unit configured to perform correlation detection for the secondary synchronization channel based on the multiple synchronization signal symbol timing candidates detected in the symbol timing candidate detection unit and a secondary synchronization channel detection unit configured to detect the secondary synchronization channel based on a result of the correlation detection by the secondary synchronization channel correlation detection unit.

20 Claims, 15 Drawing Sheets

U.S. PATENT DOCUMENTS

| | | | |
|---|---|---|---|
| 2008/0205375 A1* | 8/2008 | Onggosanusi et al. | 370/350 |
| 2009/0086713 A1* | 4/2009 | Luo | 370/350 |
| 2009/0232125 A1* | 9/2009 | Kim et al. | 370/350 |
| 2009/0238065 A1* | 9/2009 | Dapper et al. | 370/208 |
| 2010/0067500 A1* | 3/2010 | Kim et al. | 370/336 |

FOREIGN PATENT DOCUMENTS

| | | |
|---|---|---|
| JP | 2002-165274 A | 6/2002 |
| JP | 2002-165275 A | 6/2002 |
| JP | 2006-253987 A | 9/2006 |
| JP | 2007-221743 A | 8/2007 |

OTHER PUBLICATIONS

Patent Abstracts of Japan for Japanese Publication No. 2002-141886, publication date May 17, 2002 (1 page).

Patent Abstracts of Japan for Japanese Publication No. 2002-118496, publication date Apr. 19, 2002 (1 page).

Patent Abstracts of Japan, Publication No. 2007-221743, dated Aug. 30, 2007, 1 page.

Patent Abstracts of Japan, Publication No. 2002-165274, dated Jun. 7, 2002, 1 page.

Patent Abstracts of Japan, Publication No. 2006-253987, dated Sep. 21, 2006, 1 page.

Patent Abstracts of Japan, Publication No. 2002-165275, dated Jun. 7, 2002, 1 page.

3GPP TR 25.814 V7.0.0, Jun. 2006, "Physical Layer Aspects for Evolved UTRA," 126 pages.

3GPP TS 36.211 V8.2.0, Mar. 2008, "Physical Channels and Modulation," 65 pages.

3GPP TSG RAN WG1 #47bis, R1-070428, Sorrento, Italy, Jan. 15-19, 2007, "Further analysis of initial cell search for Approach 1 and 2-single cell scenario," 10 pages.

C. Chu, "Polyphase Codes With Good Periodic Correlation Properties," IEEE Trans. Inform. Theory, vol. II-18, pp. 531-532, Jul. 1972, 2 pages.

R. Frank et al., "Phase Shift Pulse Codes With Good Periodic Correlation Properties," IRE Trans. Inform. Theory, vol. IT-8, No. 6, Oct. 1962, pp. 381-382, 4 pages.

M. Golay, "Complementary Series," IRE Trans. Inform. Theory, vol. 7, pp. 82-87, Apr. 1961, 3 sheets.

3GPP TSG RAN WG1 #46bis, R1-062487, Seoul, Korea, Oct. 9-13, 2006, "Hierarchical SCH signals suitable for both (FDD and TDD) modes of E-UTRA," 4 pages.

3GPP TSG RAN WG1 Meeting #47bis, R1-070146, Sorrento, Italy, Jan. 15-19, 2007, "S-SCH Sequence Design," 5 pages.

International Search Report issued in PCT/JP2009/063995, mailed on Oct. 27, 2009, with translation, 9 pages.

Written Opinion issued in PCT/JP2009/063995, mailed on Oct. 27, 2009, 4 pages.

\* cited by examiner

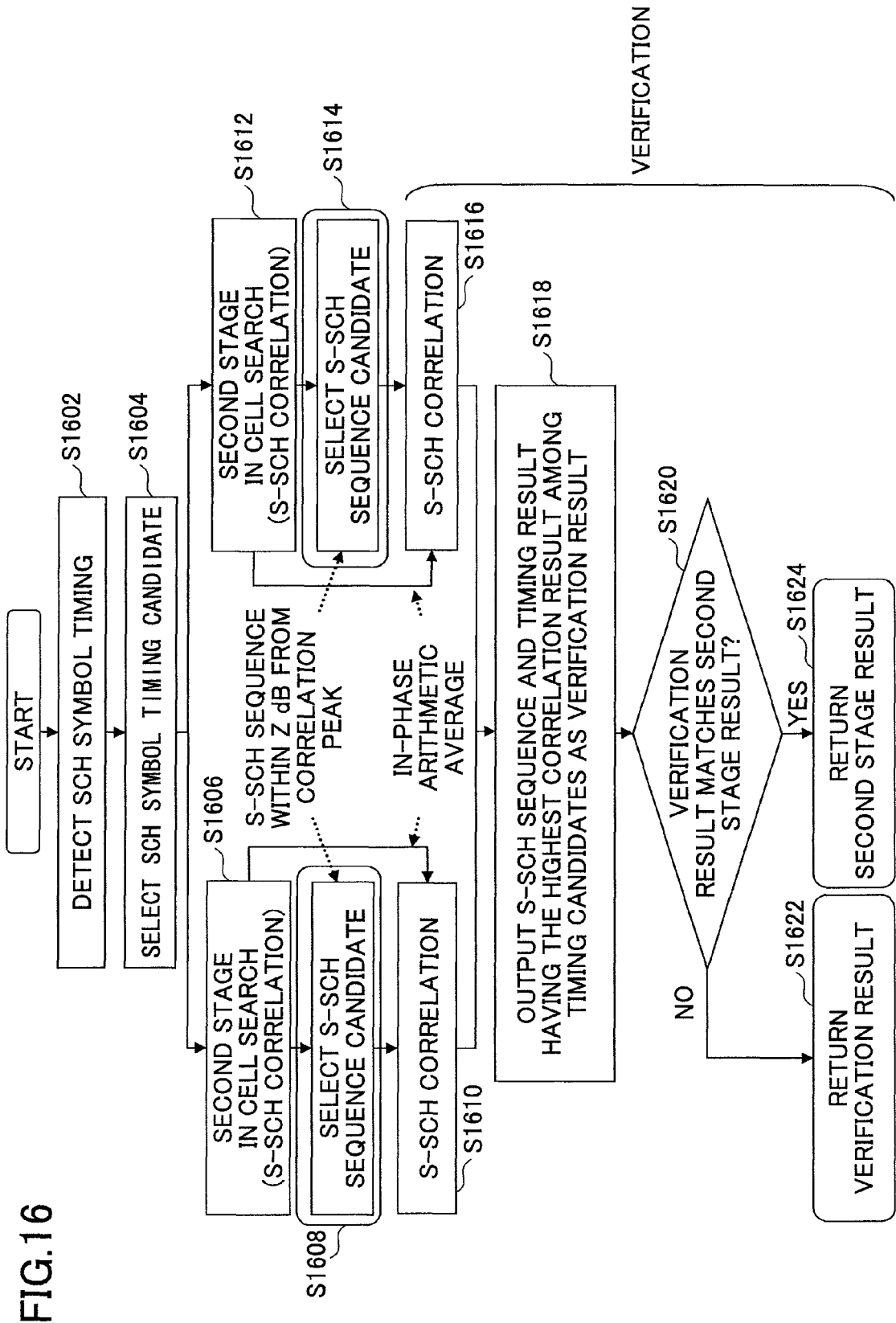

USER EQUIPMENT AND CELL SEARCH METHOD

TECHNICAL FIELD

The present invention relates to a radio communication system where OFDM (Orthogonal Frequency Division Multiplexing) is applied in downlink and particularly relates to a user equipment and a cell search method.

BACKGROUND ART

A successor communication scheme to W-CDMA (Wideband Code Division Multiple Access) and HSPA (High Speed Packet Access), that is, Evolved UTRA and UTRAN (also referred to as LTE (Long Term Evolution) or Super 3G) is being discussed in W-CDMA standardization group 3GPP ($3^{rd}$ Generation Partnership Project). In the E-UTRA, for example, OFDMA (Orthogonal Frequency Division Multiple Access) and SC-FDMA (Single-Carrier Frequency Division Multiple Access) are utilized for downlink and uplink, respectively. (See non-patent document 1, for example.)

The OFDMA is a transmission scheme where a frequency band is divided into multiple smaller frequency bands (subcarriers) and data is transmitted in the individual subcarriers. The OFDMA achieves fast transmission by arranging the subcarriers in the frequency band densely while partially overlapping the subcarriers, resulting in higher frequency utilization efficiency.

The SC-FDMA is a transmission scheme where a frequency band is divided and the different frequency bands are utilized for multiple terminals for reduction in interference among the terminals. Since the SC-FDMA has characteristics of reduced variations of transmit power, it can reduce power consumption in the terminals and realize broader coverage.

In the LTE, two types of CPs (Cyclic Prefixes) having different lengths, a long CP and a short CP, are provided for reducing influence of inter-symbol interference due to delayed waves. For example, the long CP may be for a cell having a large cell radius and be applied in transmission of MBMS (Multimedia Broadcast Multicast Service) signals, and the short CP is applied for a cell having a smaller cell radius. In the long CP applied case, six OFDM symbols are provided in one slot, and in the short CP applied case, seven OFDM symbols are provided in one slot.

Meanwhile, in a radio communication system using the W-CDMA, the LTE and so on, a mobile station must generally detect a cell having higher radio quality for itself based on a synchronization signal or others at power up, in standby period, during communication, at discontinuous reception in communication or at other timings. This process is called cell search in a sense that the mobile station searches for the cell to be connected to establish a radio link. In general, a cell search method is selected based on an amount of time required for the cell search and an amount of load of the mobile station for the cell search. In other words, the cell search method may be selected to achieve the cell search in a shorter time period at a smaller amount of processing load.

In the W-CDMA, the cell search uses two types of synchronization signals, a primary SCH (P-SCH) and a secondary SCH (S-SCH). Also in the LTE, the two types of synchronization signals P-SCH and S-SCH are used in the cell search.

In one cell search method, for example, the P-SCH having one sequence and the S-SCH having multiple sequences may be transmitted every 5 ms (non-patent document 2). In this cell search method, downlink reception timings from cells are identified based on the P-SCH, and frame reception timing and cell specific information such as a cell ID or a cell group ID are identified based on the S-SCH. Here, a channel estimate derived from the P-SCH can be generally used in demodulation and decoding of the S-SCH. Also, if the cell IDs are grouped, a relevant cell ID is selected among the cell IDs belonging to a detected cell group ID. For example, the cell ID may be determined based on a signal pattern of a pilot signal. In another example, the cell ID may be determined based on demodulation and decoding of the P-SCH. Alternatively, the cell ID may be included as an information element of the S-SCH without grouping the cell IDs. In this case, a mobile station could detect the cell ID at the S-SCH demodulation and decoding timing.

In the case where the above-mentioned cell search method is applied, however, the S-SCH transmitted from multiple cells in different sequences would be demodulated and decoded based on the channel estimate derived from the P-SCH transmitted from the multiple cells in the same sequence in an inter-station synchronization system where signals from the individual cells are synchronized. For this reason, there is a risk that transmission characteristics of the S-SCH may be degraded. Here, the transmission characteristics include time required for the cell search. On the other hand, in an inter-station asynchronization system where signals from individual cells are not synchronized, reception timings of the P-SCH sequences transmitted from the multiple cells are different from each other, which may not cause the above-mentioned problem.

In order to prevent the degradation of the S-SCH characteristics in the inter-station synchronization system as stated above, a cell search method using two or more P-SCH sequences, such as a cell search method using three P-SCH sequences, is being discussed (non-patent document 2). Alternatively, in order to prevent the degradation of the S-SCH characteristics in the inter-station synchronization system as stated above, a method for transmitting the P-SCH at different transmission intervals for different cells is proposed (non-patent document 3). According to these methods, the P-SCH having different reception timings from the multiple cells can be used in demodulation and decoding of the S-SCH, which can prevent the degradation of the S-SCH characteristics as stated above.

Meanwhile, from the viewpoint of cell design, it may be preferable that a greater number of P-SCH sequences in non-patent document 2 and more kinds of transmission intervals in non-patent document 3 be used. This is why there is a higher likelihood that the same P-SCH sequence or the same P-SCH transmission interval is used for adjacent cells in the cases of a smaller number of P-SCH sequence and less kinds of P-SCH transmission intervals, which would increase a likelihood that the S-SCH characteristics may be degraded in the inter-station synchronization system.

Also, there is trade-off between the amount of time required for the cell search, that is, transmission characteristics of the cell search, and the processing load of a mobile station for the cell search. Thus, it is desirable that it can be selected through parameter settings or operation methods on which of the transmission characteristics of the cell search or the processing load of the mobile station for the cell search greater importance is to be put.

RELATED ART DOCUMENT

Non-Patent Document

Non-patent document 1: 3GPP TR 25.814 (V7.0.0), "Physical Layer Aspects for Evolved UTRA", June 2006

Non-patent document 2: 3GPPTS36.211 (V8.2.0), "Physical channels and modulation", March 2008

Non-patent document 3: R1-070428, Further analysis of initial cell search for Approach 1 and 2-single cell scenario Non-patent document 4: C. Chu, "Polyphase codes with good periodic correlation properties", IEEE Trans. Inform. Theory, vol. 11-18, pp. 531-532, July 1972

Non-patent document 5: R. L. Frank and S. A. Zadoff, "Phase shift pulse codes with good periodic correlation properties", IRE Trans. Inform. Theory, vol. IT-8, pp. 381-382, 1962

Non-patent document 6: M. J. E. Golay, "Complementary Series", IRE Trans. Inform. Theory, vol. 7, pp. 82-87, April 1961

Non-patent document 7: 3GPP R1-062487, Hierarchical SCH signals suitable for both (FDD and TDD) modes of E-UTRA Non-patent document 8: 3GPP R1-070146, S-SCH Sequence Design

DISCLOSURE OF INVENTION

Problem to be Solved by the Invention

As stated above, the synchronization channel (SCH) is a downlink signaling channel for use in the cell search. It is determined that a hierarchical type of SCH is applied to the synchronization channel. (See non-patent document 2, for example.) In other words, the SCH consists of two subchannels, a primary synchronization channel (P-SCH) and a secondary synchronization channel (S-SCH).

In the secondary synchronization channel, cell specific information such as a cell ID group, a radio frame timing and transmit antenna quantity information is transmitted. A user equipment detects the cell specific information by detecting a S-SCH sequence.

As illustrated in FIGS. 1 and 2, a method for mapping different S-SCH sequences in the frequency direction is proposed as a S-SCH sequence mapping method. (See non-patent document 2, for example.) For example, as illustrated in FIG. 1, non-orthogonal sequence 1 ($P_1(0)$, $P_1(1)$, ..., $P_1(30)$) and non-orthogonal sequence ($P_2(0)$, $P_2(1)$, ..., $P_2(30)$) may be alternately mapped every one subcarrier. In this manner, the division of the sequences can increase the number of transmittable patterns. Specifically, if a single type of sequence having 62 subcarriers in sequence length is used, for example, 62 types of patterns could be transmitted. On the other hand, if two types of sequences having 31 subcarriers in sequence length are used as illustrated in FIG. 1, 961 types of patterns could be transmitted.

Until now, it has been established that several types of Zadoff-Chu sequences, such as three types of Zadoff-Chu sequences, are used for the P-SCH and that two types of M sequences are combined for the S-SCH. (See non-patent document 2, for example.)

Also the P-SCH and the S-SCH are transmitted in the same subframe of 1 ms, and the subframe including the P-SCH and the S-SCH occurs every 5 ms. In other words, the synchronization channels are transmitted every 5 ms. A user equipment performs the cell search by receiving different P-SCHs for different sectors to find a channel estimate for a camped sector, performing channel compensation of different S-SCHs for different cells based on the channel estimate and demodulating the S-SCHs. In this application, if there is no risk of confusion, but the terms "cell" and "sector" are equivalently used, the term "cell" may include multiple "sectors" as needed. In an inter-station synchronization system where signals from cells are synchronized, a mobile station receives the signals from the cells simultaneously.

In the cell search, the mobile station perform verification after detecting the cell specific information such as a cell ID and a radio frame timing. In the verification, it is determined whether detection results are correct. If the verification is not successful, detection miss and false detection may arise. If it is determined in the verification that the detection result is correct, the mobile station performs the above-mentioned operations. On the other hand, if it is not determined in the verification that the detection result is correct, the mobile station retries the above-mentioned operations from an operation for identifying the downlink reception timing from the cells based on the P-SCH.

The mobile station detects a SCH symbol timing and a P-SCH sequence by detecting correlation of temporal domain between a P-SCH replica signal and a received signal. For example, the mobile station finds correlation between the P-SCH replica signal and the received signal to detect the reception timing having the maximum correlation. However, the correlation result may drop at the reception timing inherently having the maximum correlation due to fading in the temporal domain. Also, the correlation result at the reception timing inherently having the maximum correlation may be lower than those of other reception timings. In these cases, it is not determined in the verification that the detection result is correct, and accordingly the mobile station would retry to detect the SCH symbol timing and the P-SCH sequence. As a result, a larger amount of time may be required for the cell search.

Accordingly, one object of the present invention is to provide a user equipment and a cell search method that can reduce the amount of time required for the cell search.

Means for Solving the Problem

In order to solve the above object, one aspect of the present invention relates to a user equipment for performing cell search using a synchronization channel including a primary synchronization channel and a secondary synchronization channel, comprising: a reception unit configured to receive a signal including the synchronization channel; a symbol timing candidate detection unit configured to detect multiple synchronization signal symbol timing candidates from the synchronization channel based on a correlation value in a time domain between the signal received at the reception unit and a replica signal of the primary synchronization channel; a secondary synchronization channel correlation detection unit configured to perform correlation detection for the secondary synchronization channel based on the multiple synchronization signal symbol timing candidates detected in the symbol timing candidate detection unit; and a secondary synchronization channel detection unit configured to detect the secondary synchronization channel based on a result of the correlation detection by the secondary synchronization channel correlation detection unit.

Another aspect of the present invention relates to a user equipment for performing cell search using a synchronization channel including a primary synchronization channel and a secondary synchronization channel, comprising: a reception unit configured to receive a signal including the synchronization channel; a symbol timing candidate detection unit configured to detect a synchronization signal symbol timing candidate from the synchronization channel based on a correlation value in a time domain between the signal received at the reception unit and a replica signal of the primary synchronization channel; a secondary synchronization channel correlation detection unit configured to perform correlation detection for the secondary synchronization channel based on the synchronization signal symbol timing candidate detected in the symbol timing candidate detection unit to detect multiple secondary synchronization channel candidates; and a secondary synchronization channel detection unit configured to detect the secondary synchronization channel based on the multiple secondary synchronization channel candidates detected in the secondary synchronization channel correlation detection unit.

Another aspect of the present invention relates to a cell search method in a user equipment for performing cell search using a synchronization channel including a primary synchronization channel and a secondary synchronization channel, the method comprising: receiving a signal including the synchronization channel; detecting multiple synchronization signal symbol timing candidates from the synchronization channel based on a correlation value in a time domain between the received signal and a replica signal of the primary synchronization channel; performing correlation detection for the secondary synchronization channel based on the detected multiple synchronization signal symbol timing candidates; and detecting the secondary synchronization channel based on a result of the correlation detection.

Another aspect of the present invention relates to a cell search method in a user equipment for performing cell search using a synchronization channel including a primary synchronization channel and a secondary synchronization channel, the method comprising: receiving a signal including the synchronization channel; detecting a synchronization signal symbol timing candidate from the synchronization channel based on a correlation value in a time domain between the received signal and a replica signal of the primary synchronization channel; performing correlation detection for the secondary synchronization channel based on the detected synchronization signal symbol timing candidate to detect multiple secondary synchronization channel candidates; and detecting the secondary synchronization channel based on the detected multiple secondary synchronization channel candidates.

Advantage of the Invention

According to the aspects of the present invention, it is possible to provide a user equipment and a cell search method that can reduce the amount of time required for the cell search.

BRIEF DESCRIPTION OF DRAWINGS

FIG. 16 is a flow diagram illustrating an operation of the user equipment according to one embodiment.

DETAILED DESCRIPTION OF EMBODIMENTS

Embodiments of the present invention are described below with reference to the drawings. In all the drawings illustrating the embodiments, the same reference symbols are attached to those having the same functions, and descriptions thereof are not repeated.

First Embodiment

[System]

Figure 1:
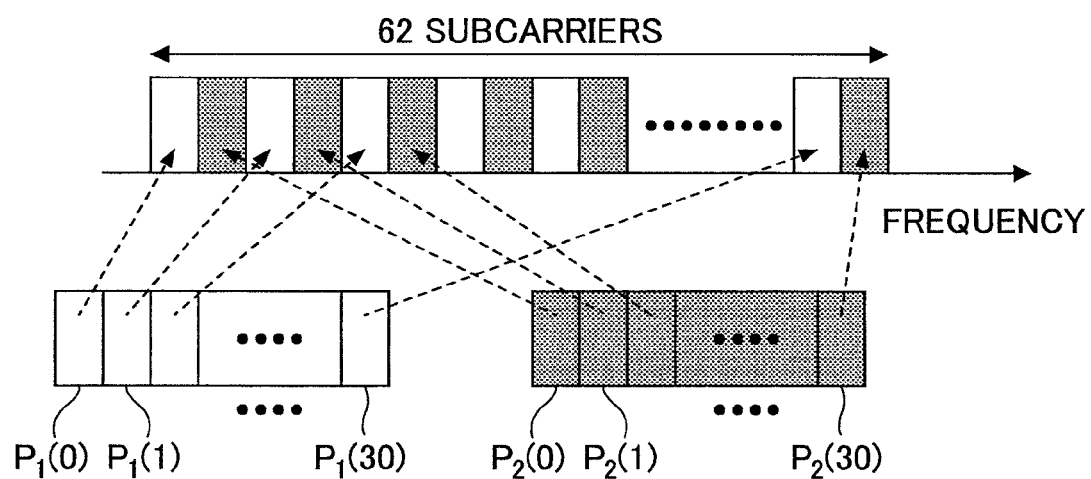
FIG. 1 is a schematic diagram illustrating a S-SCH sequence mapping method.
Figure 2:
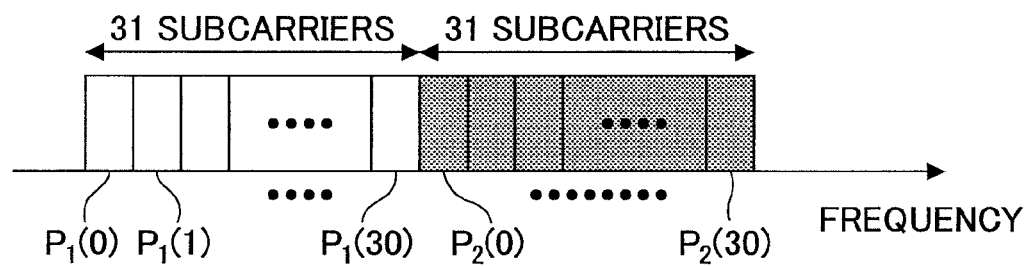
FIG. 2 is a schematic diagram illustrating a S-SCH sequence mapping method.
Figure 3:
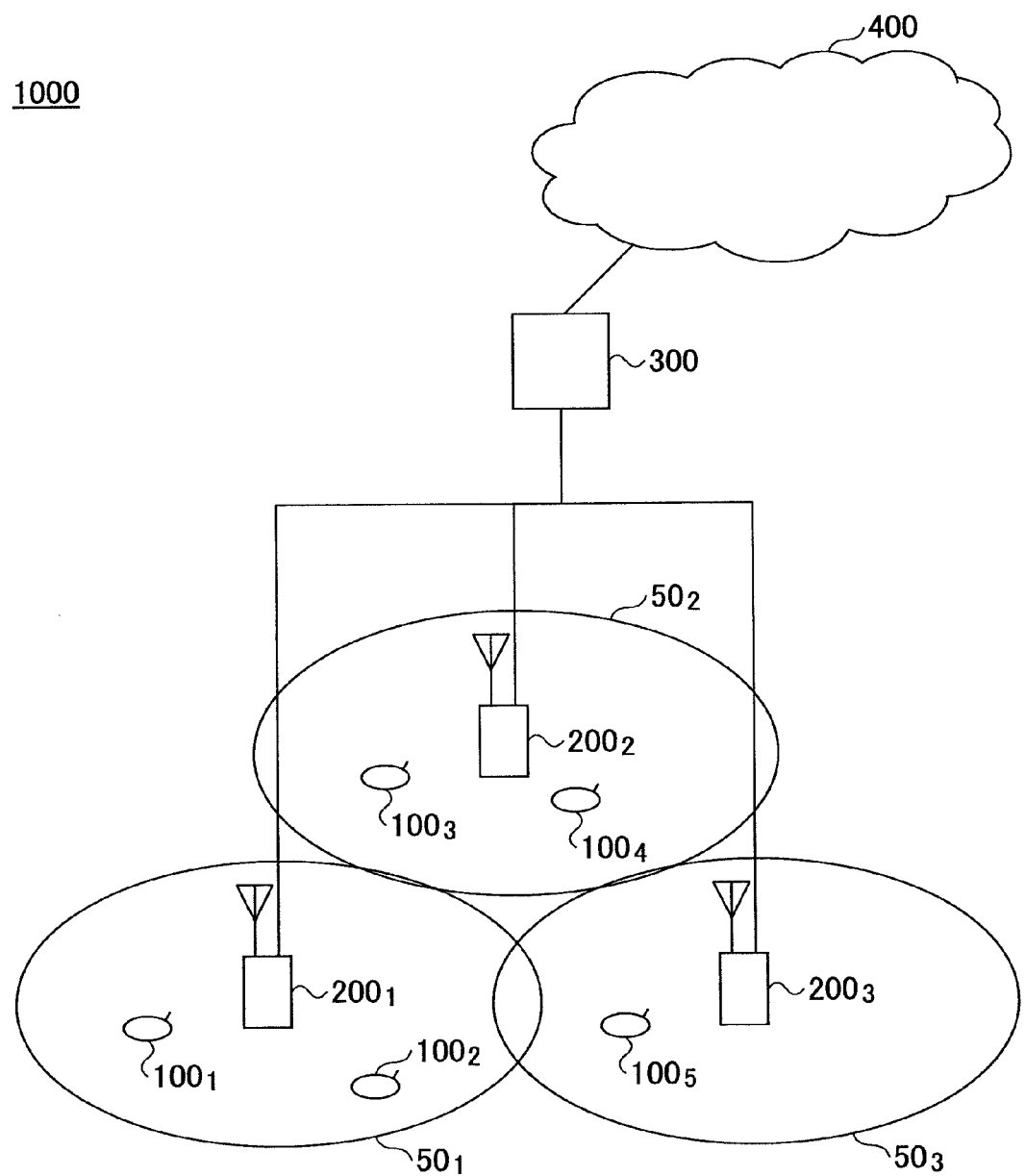
FIG. 3 is a block diagram illustrating an arrangement of a radio communication system according to one embodiment.

A radio communication system having mobile stations and base station apparatuses according to this embodiment is described with reference to FIG. 3.

A radio communication system 1000 is an Evolved UTRA and UTRAN (also referred to as Long Term Evolution or Super 3G) applied system, for example. The radio communication system 1000 includes base station apparatuses (eNB: eNode B) $200_m$ ($200_1$, $200_2$, $200_3$, ..., $200_m$ where m is a positive integer) and mobile stations $100_n$ ($100_1$, $100_2$, $100_3$, ..., $100_n$ where n is a positive integer) communicating with the base stations $200_m$. The base station 200 is connected to an upper station such as an access gateway apparatus 300, which is in turn connected to a core network 400. The mobile station $100_n$ communicates with the base station apparatus $200_m$ in any of cells $50_k$ ($50_1$, $50_2$, ..., $50_k$ where k is a positive integer) in accordance with Evolved UTRA and UTRAN.

Here, it is assumed that some of the mobile stations $100_n$ are in communication through a communication channel established with any of the base station apparatuses $200_m$ while others are not in communication without any communication channel established with any of the base station apparatuses $200_m$.

The base station apparatus $200_m$ transmits a synchronization signal. The mobile station $100_n$ resides in any of the cells $50_k$ ($50_1$, $50_2$, ..., $50_k$ where k is a positive integer) and performs the cell search for detecting a cell providing the mobile station with higher radio quality based on the synchronization signal at power up timing, at discontinuous reception timing during communication or other timings. Specifically, the mobile station $100_n$ uses the synchronization signal to detect a symbol timing and a frame timing as well as cell specific information such as a cell ID (cell specific scramble code generated from the cell ID) or a collection of cell IDs (referred to as a cell ID group hereinafter).

Here, the cell search is conducted in both cases where the mobile station $100_n$ is in communication and the mobile station $100_n$ is not in communication. For example, the cell search for mobile stations being in communication may include a cell search for detecting a cell having the same frequency and a cell search for detecting a cell having a different frequency. Also, the cell search for mobile stations not being in communication may include a cell search at power up and a cell search during standby.

Since the base station apparatuses $200_m$ ($200_1$, $200_2$, $200_3$, ..., $200_m$ where m is a positive integer) have the same arrangement, function and state, the base station apparatus $200_m$ is described below unless specifically stated otherwise. Since the mobile stations $100_n$ ($100_1$, $100_2$, $100_3$, ..., $100_n$ where n is a positive integer) have the same arrangement, function and state, the mobile stations $100_n$ is described below unless specifically stated otherwise. Since the cells $50_k$ ($50_1$, $50_2$, ..., $50_k$ where k is a positive integer), the cell $50_k$ is described below unless specifically stated otherwise.

In the radio communication system 1000, the OFDMA and the SC-FDMA are applied as radio access schemes to downlink and uplink, respectively. As stated above, the OFDMA is a transmission scheme where a frequency band is divided into multiple smaller frequency bands (subcarriers) and data is transmitted in the individual frequency bands. The SC-FDMA is a transmission scheme where a frequency band is divided and the divided different frequency bands are used among different terminals, resulting in reduction in inter-terminal interference.

Communication channels in the Evolved UTRA and UTRAN are described below.

For downlink, a PDSCH (Physical Downlink Shared Channel) shared among the mobile stations $100_n$ and a LTE downlink control channel are used. In downlink, the LTE downlink control channel is used to transmit information on mobile stations mapped to the PDSCH and associated transport format information, information on mobile station mapped to a physical uplink shared channel and associated transport format information, acknowledgement information on the physical uplink shared channel and so on. The PDSCH is used to transmit user data.

Also, the base station apparatus $200_m$ transmits a synchronization signal in downlink so that the mobile station $100_n$ can perform cell search.

For uplink, a PUSCH (Physical Uplink Shared Channel) shared among the mobile stations $100_n$ and a LTE uplink control channel are used. The uplink control channel includes two types of channels, that is, a channel time-multiplexed with the PUSCH and a channel frequency-multiplexed with the PUSCH.

In uplink, the LTE uplink control channel is used to transmit a downlink CQI (Channel Quality Indicator) for use in scheduling and AMC (Adaptive Modulation and Coding) for the PDSCH and acknowledgement information (HARQ ACK information) on the PDSCH. Also, the PUSCH is used to transmit user data.

Figure 4:
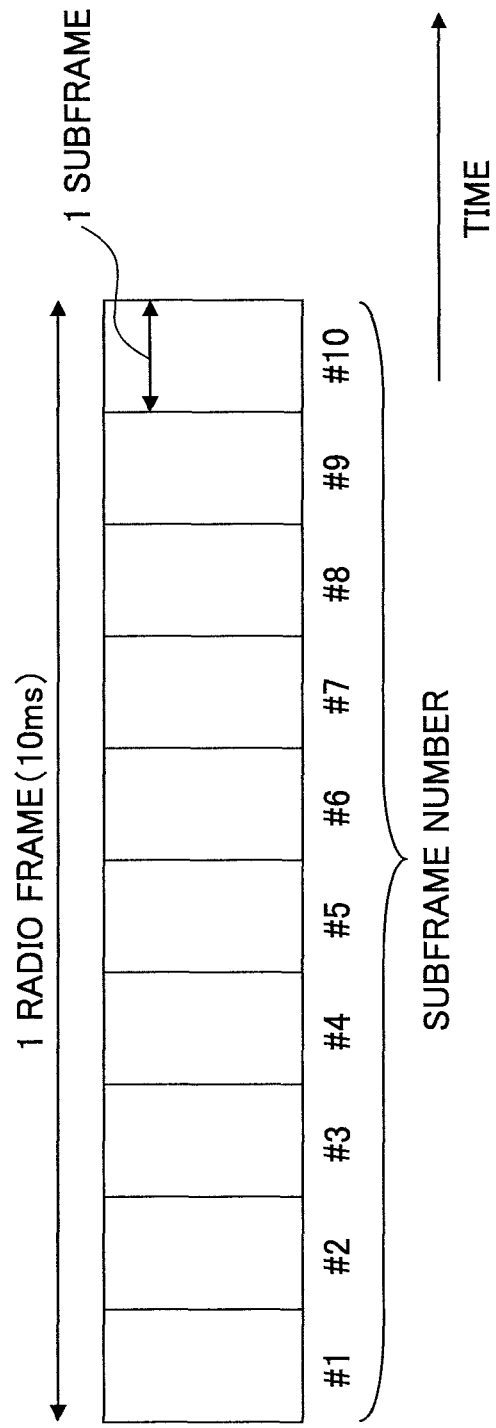
FIG. 4 is a schematic diagram illustrating an arrangement of a radio frame.
Figure 5:
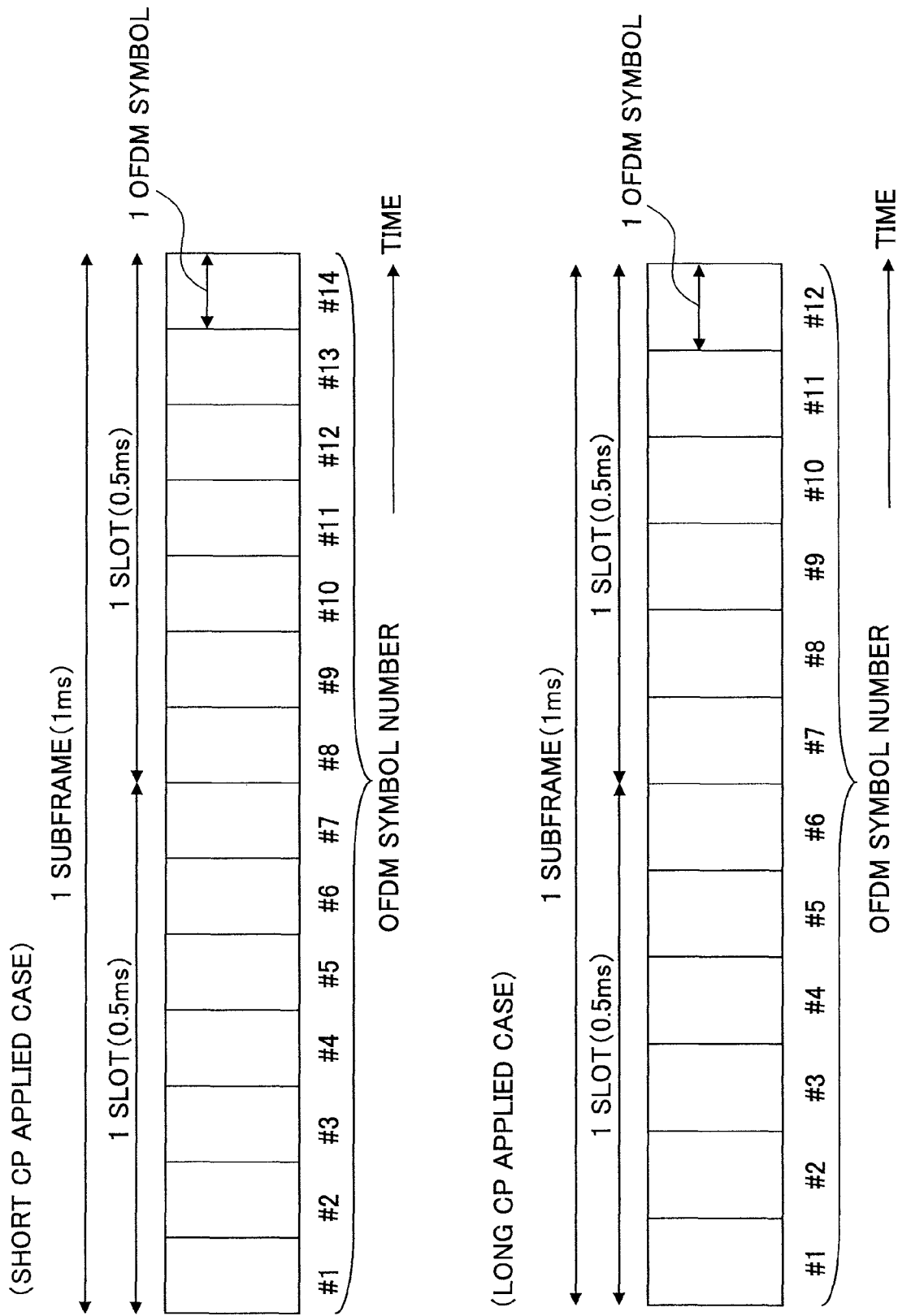
FIG. 5 is a schematic diagram illustrating an arrangement of a subframe.

As illustrated in FIG. 4, one radio frame has 10 ms and includes 10 subframes in downlink. Also, as illustrated in FIG. 5, one subframe consists of two slots. If a short CP is used, the single slot consists of seven OFDM symbols (upper portion in FIG. 5), and if a long CP is used, the single slot consists of six OFDM symbols (lower portion in FIG. 5).

[Base Station Apparatus eNB]

Figure 6:
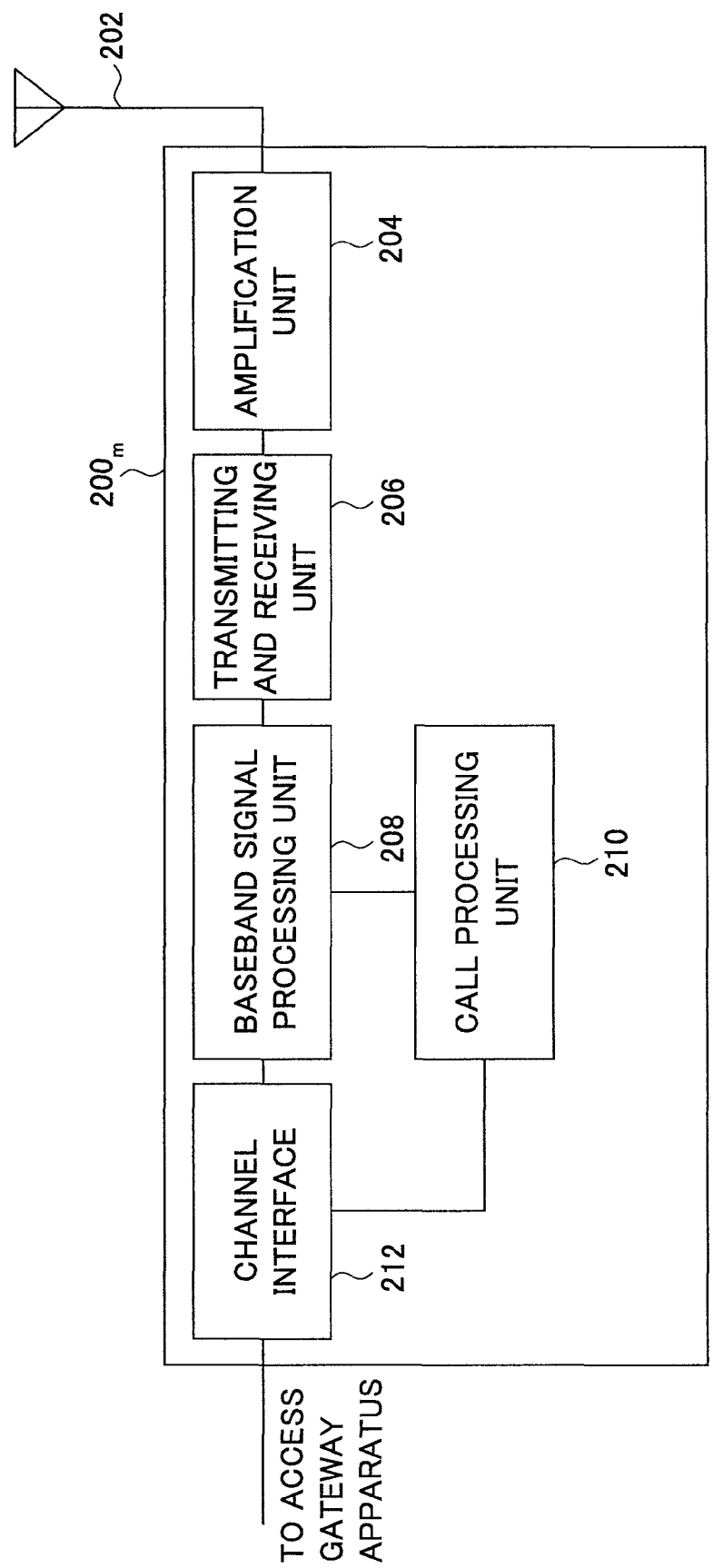
FIG. 6 is a partial block diagram illustrating a base station apparatus according to one embodiment.

The base station apparatus $200_m$ according to this embodiment is described with reference to FIG. 6.

The base station apparatus 200 according to this embodiment includes a transmit and receive antenna 202, an amplification unit 204, a transmitting and receiving unit 206, a baseband signal processing unit 208, a call processing unit 210 and a channel interface 212.

Packet data transmitted from the base station apparatus $200_m$ to the mobile station $100_n$ in downlink is supplied from a station upper to the base station apparatus $200_m$ such as the access gateway apparatus 300 to the baseband signal processing unit 208 via the channel interface 212.

The baseband signal processing unit 208 performs segmentation and concatenation, RLC (Radio Link Control) layer transmission operations such as a transmission operation for RLC retransmission control, MAC retransmission control, HARQ (Hybrid Automatic Repeat reQuest) transmission operations, scheduling, transmission format selection and channel coding, and inverse fast Fourier transform (IFFT) on packet data and forwards the resulting signal to the transmitting and receiving unit 206. Also, the baseband signal processing unit 208 performs a generation operation of a synchronization signal as stated below. The synchronization signal is multiplexed and forwarded to the transmitting and receiving unit 206.

The transmitting and receiving unit 206 performs frequency conversion for converting the baseband signal supplied from the baseband signal processing 208 into a radio frequency band, and then the resulting signal is amplified in the amplification unit 204 and transmitted from the transmitting and receiving unit 202. Here, the baseband signal is packet data, a synchronization signal and so on.

On the other hand, for data transmitted from the mobile station $100_n$ to the base station apparatus $200_m$ in uplink, a radio frequency signal received at the transmitting and receiving antenna 202 is amplified in the amplification unit 204 and frequency converted into a baseband signal in the transmitting and receiving unit 206. The resulting baseband signal is supplied to the baseband signal processing unit 208.

The baseband signal processing unit 208 performs a FFT operation, error correction decoding, a reception operation in MAC retransmission control and a RLC layer reception operation on the incoming baseband signal and forwards the resulting signal to the access gateway apparatus 300 via the channel interface 212.

The call processing unit 210 performs state management of the base station apparatus 200 and resource assignment.

Figure 7:
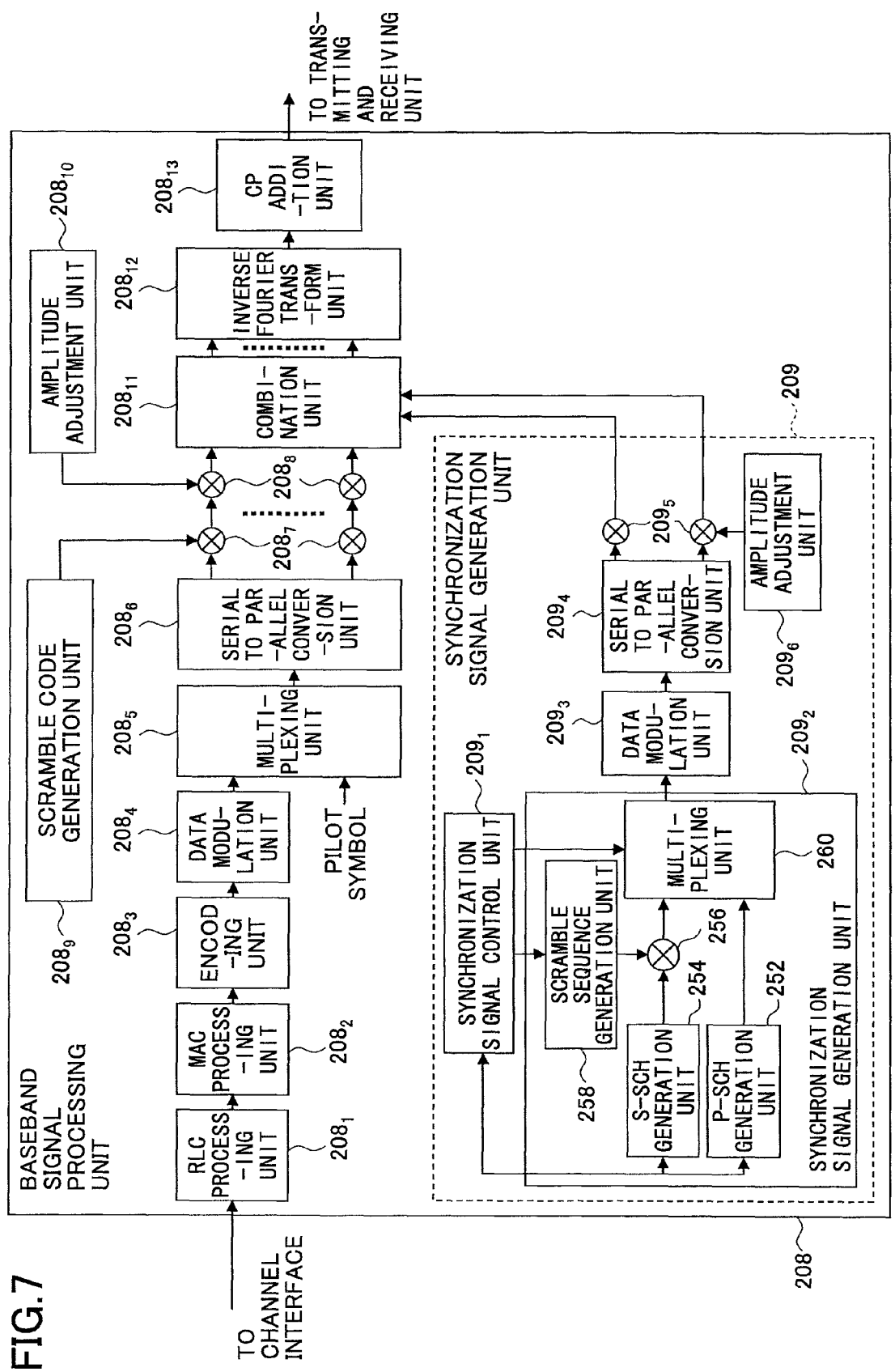
FIG. 7 is a block diagram illustrating a baseband signal processing unit in a base station apparatus according to one embodiment.

Next, an arrangement of the baseband signal processing unit 208 is described with reference to FIG. 7. In FIG. 7, portions related to downlink operations are illustrated, and portions related to uplink operations are omitted.

[Baseband Signal Processing Unit]

The baseband signal processing unit 208 includes a RLC processing unit $208_1$, a MAC (Medium Access Control) processing unit $208_2$, an encoding unit $208_3$, a data modulation unit $208_4$, a multiplexing unit $208_5$, a serial to parallel conversion unit $208_6$, multipliers $208_7$, multipliers $208_8$, a scramble code generation unit $208_9$, an amplitude adjustment unit $208_{10}$, a combination unit $208_{11}$, an IFFT (IDFT) $208_{12}$, a CP addition unit $208_{13}$ and a synchronization signal generation unit 209.

The RLC processing unit $208_1$ performs segmentation and concatenation and RLC layer transmission operations such as a transmission operation for RLC retransmission control on a transmission data sequence of downlink packet data received from the channel interface 212. The MAC processing unit $208_2$ performs a HARQ transmission operation, scheduling, transmission format selection and a MAC layer transmission operation such as frequency resource assignment on the resulting signal of the RLC processing unit $208_1$. Then, the encoding unit $208_3$ encodes the resulting signal of the MAC processing unit $208_3$, and the data modulation unit $208_4$ performs data modulation. The multiplexing unit $208_5$ multiplexes the data modulated transmission data sequence with pilot symbols. The serial to parallel conversion unit $208_6$ performs serial to parallel conversion on the pilot symbol multiplexed transmission data sequence into N information symbol sequences on a frequency axis for arrangement on the frequency axis. Here, the pilot symbol may be a downlink reference signal (DL-RS), for example. Each of N multipliers $208_7$ multiplies the N information symbol sequences on the frequency axis with scramble codes supplied from the scramble code generation unit $208_9$ in the frequency direction. In addition, each of N multipliers $208_8$ multiplies the scramble code multiplied symbol sequences with an amplitude adjustment sequence value supplied from the amplitude adjustment unit $208_{10}$ to supply to the combination unit $208_{11}$. The combination unit $208_{11}$ multiplexes the scramble code and amplitude adjustment sequence value multiplied symbol sequence having the sequence length N with a synchronization signal generated in the synchronization signal generation unit 209 in a relevant subcarrier in N subcarriers.

As stated below, a synchronization signal control unit $209_1$ determines the subframe number and the slot number for transmitting the synchronization signal. In the subframe number and the slot number for transmitting the synchronization signal, the combination unit $208_{11}$ combines the synchronization signal generated in the synchronization signal generation unit 209 with other signals (a symbol sequence resulting from multiplication of the downlink packet data with the scramble code and the amplitude adjustment sequence value). In subframe numbers and slot numbers where the synchronization signal is not transmitted, the synchronization signal generated in the synchronization signal generation unit 209 is not multiplexed. In this case, only the symbol sequence of the sequence length N resulting from multiplication of the downlink packet data with the scramble code and the amplitude adjustment sequence value is supplied to the IFFT unit $208_{12}$. The synchronization signal multiplexed subcarrier is located in a center band of the overall bandwidth. Also, the bandwidth of the synchronization signal multiplexed subcarrier may be set to 945 kHz, for example.

The IFFT unit $208_{12}$ transforms N symbols into an orthogonal multicarrier signal. The CP addition unit $208_{13}$ inserts a CP in this multicarrier signal for each Fourier directed time. There are two types of CP lengths, a long CP and a short CP, and it is determined which of the CP lengths is used for each cell.

[Synchronization Signal Generation Unit]

A generation operation of a synchronization signal in the synchronization signal generation unit 209 is described. The synchronization signal includes a primary synchronization signal (referred to as a primary synchronization channel or P-SCH hereinafter) and a secondary synchronization signal (referred to as a secondary synchronization channel or S-SCH).

The synchronization signal generation unit 209 includes the synchronization signal control unit $209_1$, a synchronization signal generation unit $209_2$, a data modulation unit $209_3$, a serial to parallel conversion unit $209_4$, multipliers $209_5$ and an amplitude adjustment unit $209_6$.

The synchronization signal generation unit $209_2$ includes a P-SCH generation unit 252, a S-SCH generation unit 254, a multiplier 256, a scramble sequence generation unit 258 and a multiplexing unit 260. The synchronization signal control unit $209_1$ is connected to the P-SCH generation unit 252, the S-SCH generation unit 254, the scramble sequence generation unit 258 and the multiplexing unit 260 in the synchronization signal generation unit $209_2$.

The synchronization signal control unit $209_1$ determines a P-SCH sequence number and a S-SCH sequence number as well as a subframe number and a slot number for transmitting the P-SCH and the S-SCH based on a cell ID or a cell ID group for a cell where the base station apparatus $200_m$ provides communication in the Evolved UTRA and UTRAN. For example, the mobile station may identify the cell based on a pilot signal, that is, a signal pattern of a reference signal (RS), after identifying the cell ID group. In this case, it is presumed that the signal pattern of the reference signal and the cell ID are predefined. Alternatively, the mobile station may identify the cell based on demodulation and decoding of the P-SCH and the S-SCH, for example. In this case, it is presumed that the P-SCH sequence number and the cell ID are predefined. In the P-SCH, different sequences would be selected for different sectors, for example. For example, the P-SCH of a cell consisting of three sectors would be selected from a set of three distinct sequences.

Then, the synchronization signal control unit $209_1$ indicates the P-SCH sequence number and the S-SCH sequence number to the P-SCH generation unit 252 and the S-SCH generation unit 254, respectively. Also, the synchronization signal control unit $209_1$ indicates the subframe and the slot number for transmitting the P-SCH and the S-SCH as synchronization signal transmission timing information to the multiplexing unit 260.

Figure 8:
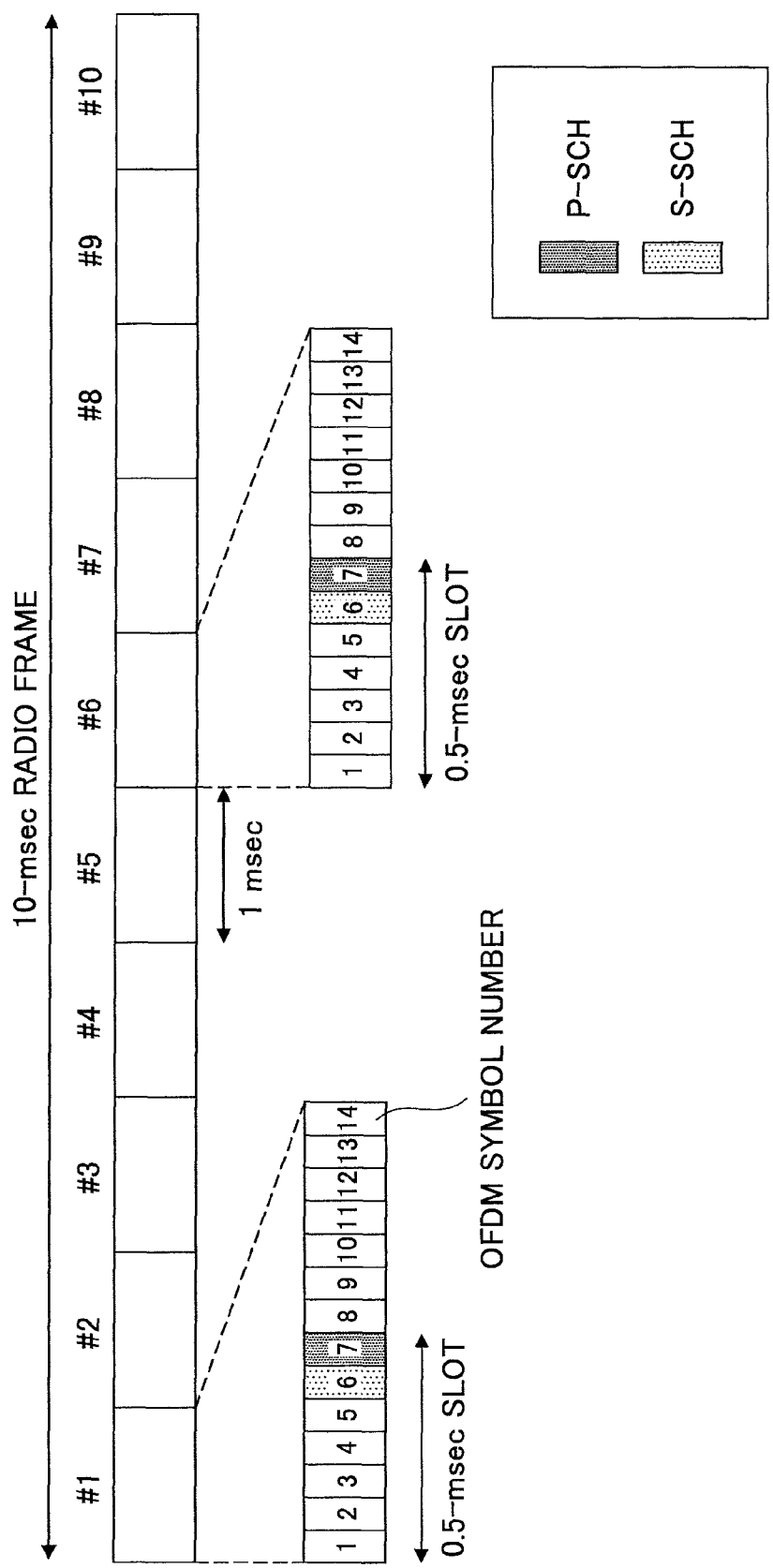
FIG. 8 is a schematic diagram illustrating an exemplary definition of a synchronization signal transmission pattern.

For example, the radio communication system 1000 defines the subframe numbers and the slot numbers for transmitting the P-SCH and the S-SCH, as illustrated in non-patent document 5 and FIG. 8. In this example, several types of P-SCH sequences, for example, three types of P-SCH sequences, are used to transmit the synchronization signal in subframes numbers #1 and #6. Also in this example, the P-SCH is mapped to the last OFDM symbol in the slots, and the mobile station can demodulate the P-SCH in any of the cases of the long CP and the short CP. This is because the sixth OFDM symbol in the case of the long CP temporally corresponds to the seventh OFDM symbol in the case of the short CP in the last OFDM symbol of the slots. In other words, for any of the short CP and the long CP, timings of the slot heads would correspond to timings of the slot tails. Then, the radio communication system may associate the P-PSCH sequence number with the cell ID information beforehand. If the radio communication system 1000 conducts the association, the synchronization signal control unit $209_1$ in the individual base station apparatuses $200_m$ can determine the P-SCH sequence number based on the cell ID of the cell where the base station apparatuses $200_m$ provide communication with the Evolved UTRA and UTRAN.

Generally, a communication area served by the base station apparatus $200_m$ is divided into two or more areas. This is called sectorization. In the case where the base station apparatus $200_m$ has multiple sectors, the cell ID or the cell ID group may be used as an ID for an area including all the sectors of the base station apparatus $200_m$ or as an ID for each of the sectors of the base station apparatus $200_m$. In the case where the cell ID or the cell ID group is used as the ID for the area including all the sectors of the base station apparatus $200_m$, a combination of the synchronization signal sequence with the subframe number and the slot number for transmitting the synchronization signal are set for each of the base station apparatuses $200_m$. In the case where the cell ID or the cell ID group is used as the ID for the individual sectors of the base station apparatuses $200_m$, a combination of the synchronization signal sequence with the subframe number and the slot number transmitting the synchronization signal is set for each of the sectors of the base station apparatus $200_m$.

As the P-SCH sequence, a CAZAC (Constant Amplitude Zero AutoCorrelation) sequence such as a Zadoff-Chu sequence (non-patent document 4), a Frank sequence (non-patent document 5), a modulated Frank sequence (non-patent document 5), a Golay complementary sequence (non-patent document 6), a double repetitive Golay complementary sequence (non-patent document 7, a PN (Pseudo Noise) sequence and so on may be used.

Also as the S-SCH sequence, a two-layer type of S-SCH sequence resulting from multiplication of a scramble sequence being an orthogonal sequence or non-orthogonal sequence with an orthogonal sequence or non-orthogonal sequence (non-patent document 8), a S-SCH sequence resulting from alternate arrangement of several orthogonal sequences or non-orthogonal sequences in a frequency domain or a S-SCH sequence resulting from multiplication of a scramble sequence being an orthogonal sequence or non-orthogonal sequence with several orthogonal sequences or non-orthogonal sequences (non-patent document 2) may be used. The orthogonal sequence may be a Walsh-Hadamard sequence, a phase shift orthogonal sequence or an orthogonal M sequence. The non-orthogonal sequence may be a CAZAC sequence such as a GCL sequence, a Golay sequence, a Golay complementary sequence (non-patent document 6), a M sequence (non-patent document 2) and a PN sequence.

[First S-SCH Sequence Determination Method]

The P-SCH generation unit 252 and the S-SCH generation unit 254 generate the P-SCH sequence and the S-SCH sequence, respectively, based on synchronization signal sequence information and synchronization signal transmission timing information indicated by the synchronization signal control unit $209_1$.

Figure 9:
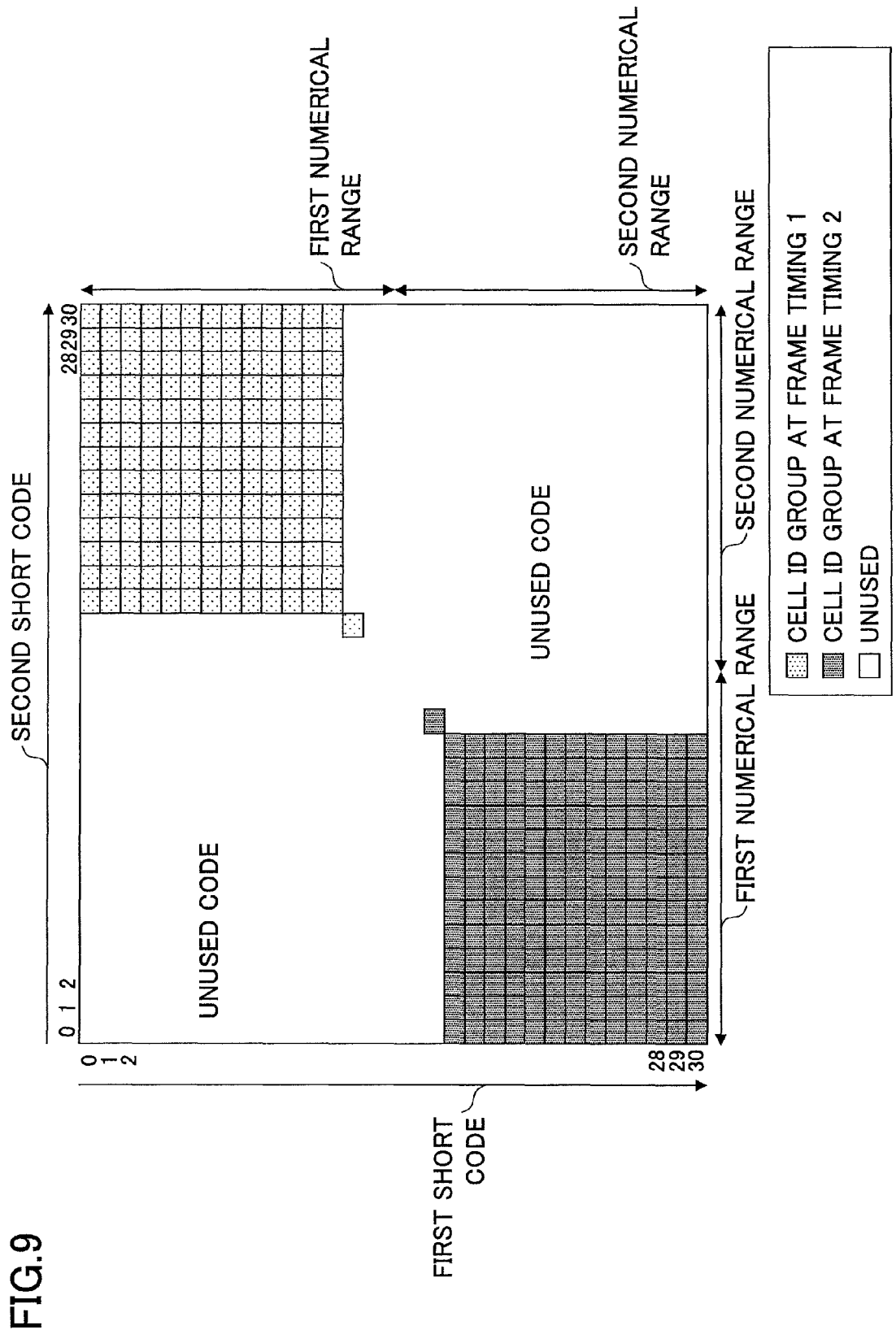
FIG. 9 is a schematic diagram illustrating a S-SCH sequence determination method.

For example, the synchronization signal generation unit $209_2$ may make cell specific information layered to generate the S-SCH. The cell specific information includes at least one of a cell ID group, a radio frame timing and transmit antenna quantity information. Here, when a mobile station conducts cell search, the radio communication system 1000 may indicate a portion of the layered information as prior information such as neighboring cell information. For example, the cell ID group, a portion of the cell ID group, the radio frame timing, the transmit antenna quantity information or a combination of the cell ID group, the portion of the cell ID group, the radio frame timing and the transmit antenna quantity information may be indicated as the prior information. In this manner, it is possible to reduce the number of detected sequences in the cell search by the mobile station. Specifically, as illustrated in FIG. 9, the cell ID groups may be classified into several types of sequences, for example, two types of sequences each including a short code of 31 in sequence length. The first short code in the vertical axis in FIG. 9 represents a sequence index of the first short code in the case where two types of short codes of 31 in sequence length are used in the S-SCH sequence. The second short code in the horizontal axis in FIG. 9 represents a sequence index of the second short code. For any of the short codes, 31 sequence indices are provided, but the number of sequence indices assigned to the first and second short codes may be limited if needed, as stated above.

As illustrated, the sequence index of the first short code for use at (frame) timing #1 is selected from the first numerical range (0-13). The sequence index of the second short code for use at this timing #1 is selected from the second numerical range (23-30). The sequence index of the first short code for use at timing #2 after 5 ms from timing #1 is selected from the second numerical range (23-30). The sequence index of the second short code for use at this timing #2 is selected from the first numerical range (0-13).

In this manner, if the numerical ranges of the sequence indices for use at timings #1 and #2 do not overlap with each other, this is advantageous in quick determination as to whether the detected sequence index of the first short code corresponds to timing #1 in addition to reduction in code candidates in searching for the first and second short codes and faster search.

[Second S-SCH Sequence Determination Method]

Figure 10:
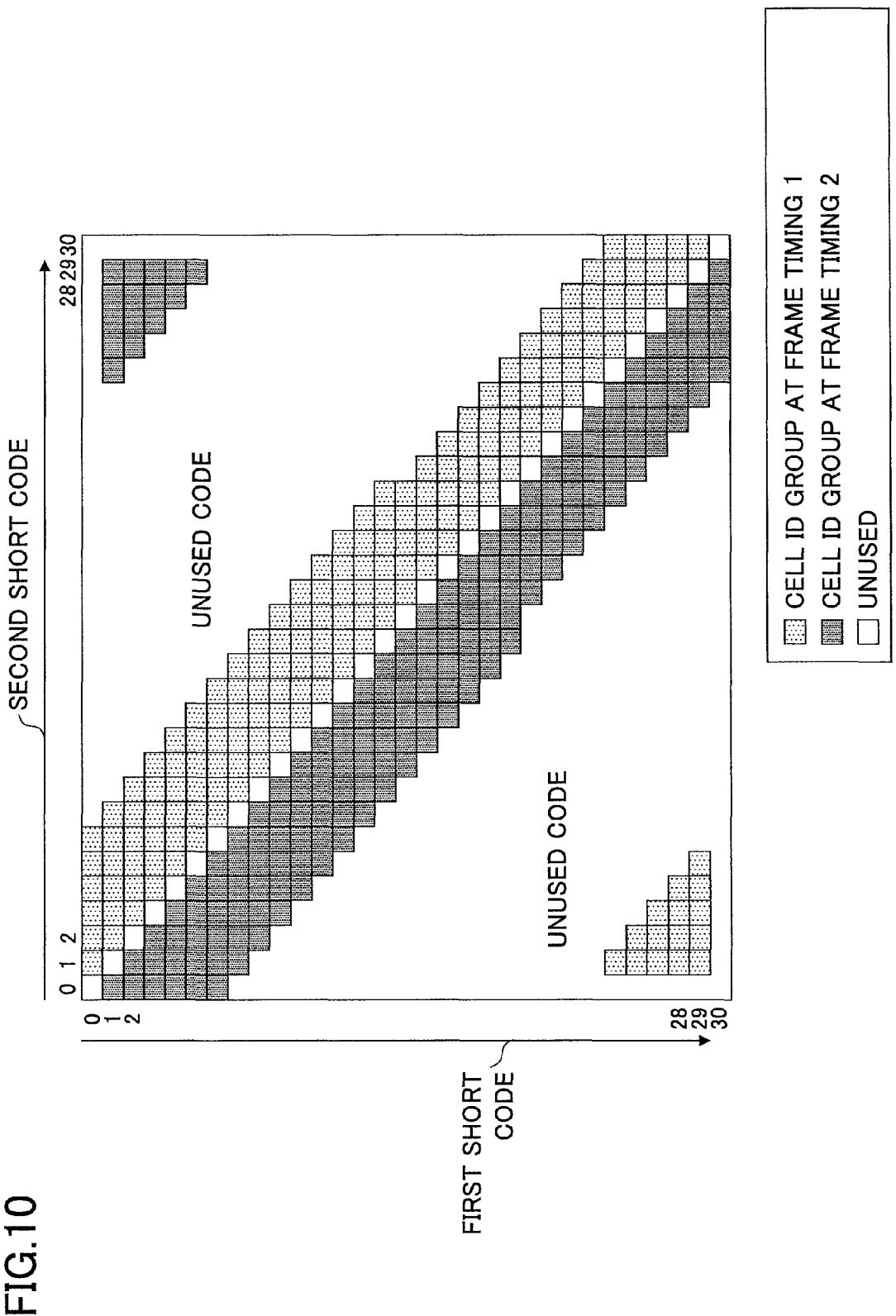
FIG. 10 is a schematic diagram illustrating another S-SCH sequence determination method.

FIG. 10 is a schematic diagram illustrating another S-SCH sequence determination method. In the illustrated example, the sequence indices of the first and second short codes are selected from the same numerical range (0-30). For convenience, it is assumed that the sequence indices of the first and second short codes are m and n, respectively. In the illustrated example, a combination of m and n are selected such that the condition $m-n \leq \Delta$ or $n-m \leq \Delta$ is satisfied. The indices m and n are integers in the numerical range (0-30), and $\Delta$ is an integer less than or equal to 29. In this method, the sequence indices can be selected from the numerical range broader than that of the case illustrated in FIG. 9, and the freedom of code combinations available for the S-SCH increases, which is preferred to avoid collision.

[Third S-SCH Sequence Determination Method]

Figure 11:
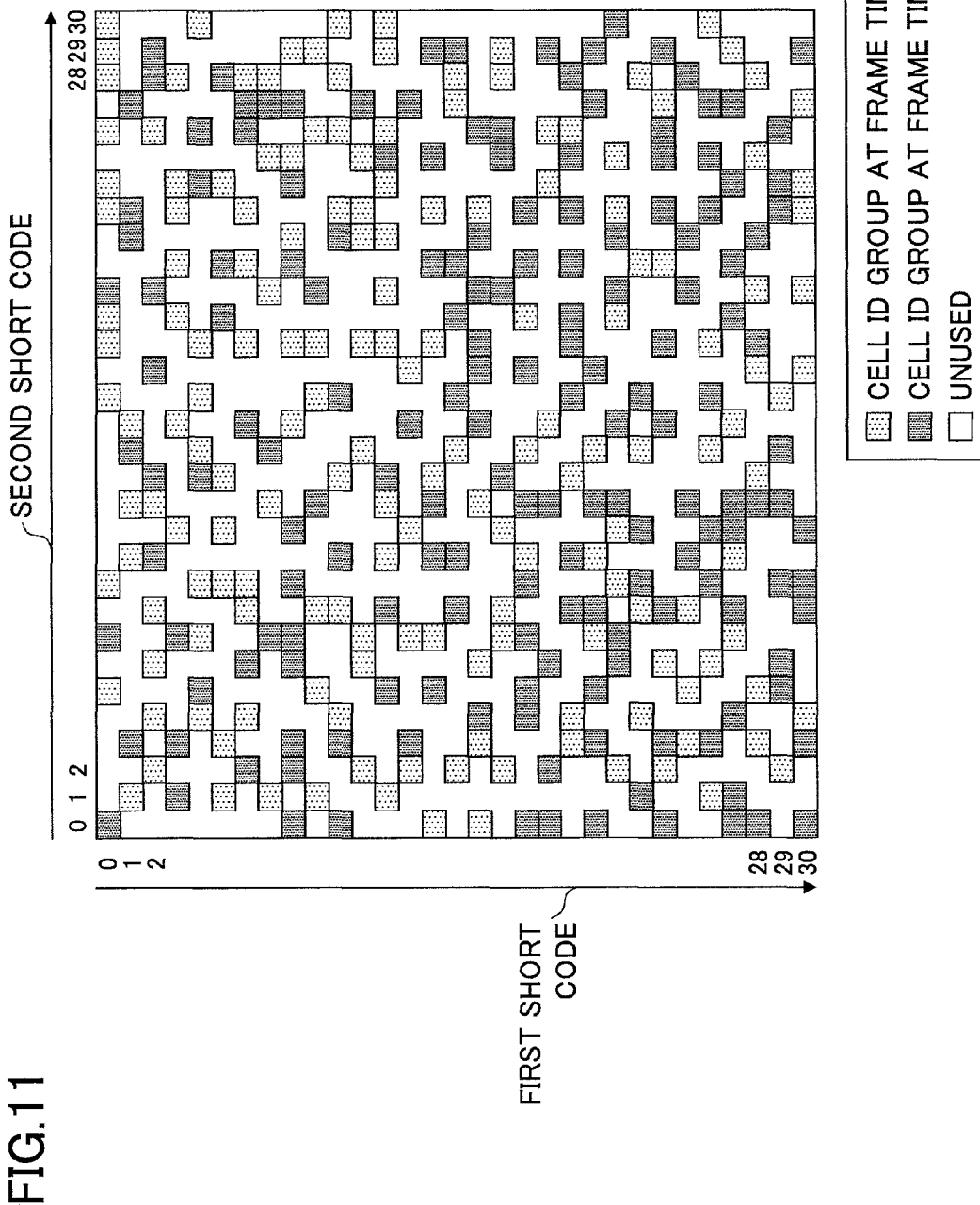
FIG. 11 is a schematic diagram illustrating another S-SCH sequence determination method.

FIG. 11 is a schematic diagram illustrating another S-SCH determination method. Also in the illustrated example, the sequence indices of the first and second short codes is selected from the same numerical range (0-30). However, there is no simple regularity as illustrated in FIGS. 9 and 10, and the first and second short codes are combined in various manners such that the same combination does not occur.

Alternatively, the S-SCH sequence determination method is set as disclosed in non-patent document 2.

The P-SCH sequence generated in the P-SCH generation unit 252 is supplied to the multiplexing unit 260, and the S-SCH sequence generated in the S-SCH generation unit 254 is supplied to the multiplier 256. The synchronization signal control unit $209_1$ supplies information indicative of a scramble sequence to the scramble sequence generation unit 258. For example, the synchronization signal control unit $209_1$ supplies information indicative of a common scramble code over all cells to the scramble sequence generation unit 258. The scramble sequence generation unit 258 generates a scramble sequence based on the information indicative of the scramble sequence supplied from the synchronization signal control unit $209_1$ and supplies the generated scramble sequence to the multiplier 256. In the multiplier 256, the scramble sequence is multiplied with the S-SCH, and the resulting S-SCH sequence is supplied to the multiplexing unit 260. As to the scramble sequence length, the scrambling (spreading) may be conducted over the two types of short codes or for each of the two types of short codes. Multiple types of scramble codes may be used to indicate system information for the S-SCH sequence such as the radio frame timing, the cell ID group, the transmit antenna quantity information and so on.

In the case where the same S-SCH sequence is used in adjacent cells and/or in cells within the same base station, however, interference from the adjacent cells may degrade the detection likelihood of the S-SCH in a user equipment. For this reason, a larger amount of time may be required for the cell search, which may lead to degradation of cell search time characteristics. In order to solve the problem through randomization of the interference from the adjacent cells, the synchronization signal control unit $209_1$ preferably provides the scramble sequence generation unit 258 with information indicative of different scramble sequences selected for different cells from multiple types of scramble codes. In this case, different scramble sequences for the different cells, that is, multiple types of scramble sequences, or different scramble sequences for the different base stations may be used as the S-SCH scramble sequence. In this case, the scramble sequence generation unit 258 generates the scramble sequence based on the information indicative of the scramble sequence supplied from the synchronization signal control unit 209₁ and supplies the generated scramble sequence to the multiplier 256. Here, the scramble sequence generation unit 258 may generate a scramble sequence specific to the P-SCH sequence corresponding to the P-SCH sequence number.

Also, as disclosed in non-patent document 2, the scramble sequence generation unit 258 may generate a scramble sequence specific to the sequence number for one short code of two types of short codes. In the multiplier 256, the scramble code supplied from the scramble sequence generation unit 258 is multiplied with the S-SCH sequence, and the resulting scramble sequence is supplied to the multiplexing unit 260. As to the scramble sequence length, the scrambling may be conducted over the two types of short codes or for each of the two types of short codes. For example, the multiplied scramble sequence may be a scramble sequence specific to all cells, a scramble sequence specific to the P-SCH sequence, multiple types of scramble sequences or a scramble sequence specific to the sequence number for one short code of the two types of short codes. Also, for example, one short code of two types of short codes may be multiplied with a common scramble sequence over all cells, and the other short code may be multiplied with the scramble sequence specific to the P-SCH sequence. Also, for example, one short code of two types of short codes may be multiplied with the scramble sequence specific to the P-SCH sequence, and the other short code may be multiplied with a scramble code specific to the sequence number of the other short code. Multiple types of scramble codes may be used to indicate system information to the S-SCH sequence such as the radio frame timing, the cell ID group and the transmit antenna quantity information. The multiplexing unit 260 multiplexes the P-SCH sequence with the scramble code multiplied S-SCH sequence and supplies the resulting sequence to the data modulation unit 209₃.

The data modulation unit 209₃ performs data modulation on the synchronization signal sequence generated in the synchronization signal generation unit 209₂, and the serial to parallel conversion unit 209₄ performs serial to parallel conversion on the modulated sequence to generate $N_{SCH}$ symbol sequences on the frequency axis. In the multipliers 209₅, the $N_{SCH}$ symbol signals are multiplied with an amplitude adjustment sequence value from the amplitude adjustment unit 209₆, and the resulting signals are supplied to the combination unit 208₁₁.

[User Equipment UE]

Figure 12:
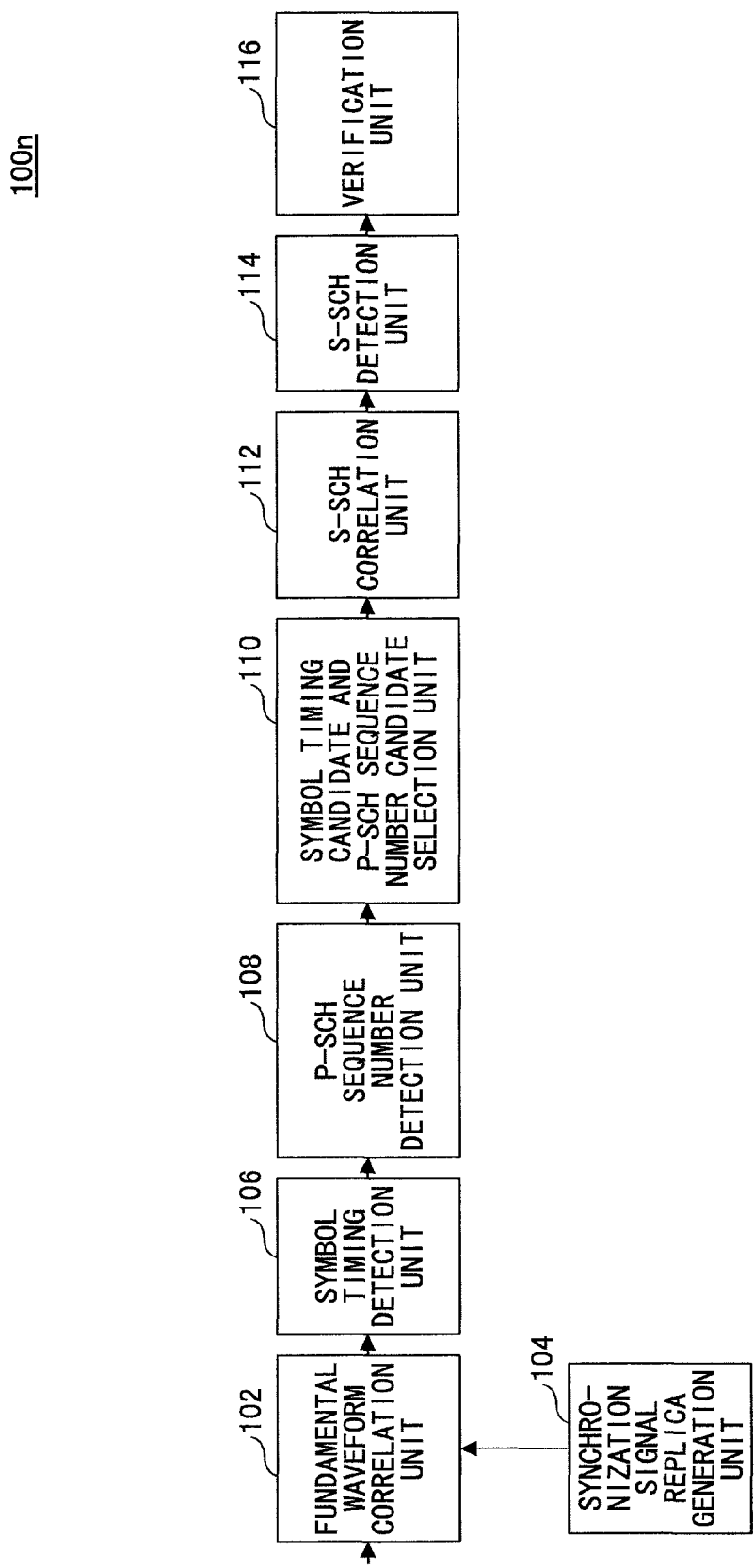
FIG. 12 is a partial block diagram illustrating a user equipment according to one embodiment.

Next, the mobile station 100ₙ according to this embodiment is described with reference to FIG. 12.

The mobile station 100ₙ includes a fundamental waveform correlation unit 102, a synchronization signal replica generation unit 104, a symbol timing detection unit 106, a P-SCH sequence number detection unit 108, a symbol timing candidate and P-SCH sequence number candidate selection unit 110, a S-SCH correlation unit 112, a S-SCH detection unit 114 and a verification unit 116.

The mobile station 100ₙ supplies a multicarrier signal received at an antenna to the fundamental waveform correlation unit 102. On the other hand, the synchronization signal replica generation unit 104 generates a synchronization signal replica having a predefined fundamental signal waveform and supplies the generated synchronization signal replica to the fundamental waveform correlation unit 102 sequentially. For example, the synchronization signal replica generation unit 104 generates a synchronization signal replica including three different sequences and supplies the generated synchronization signal replica to the fundamental waveform correlation unit 102.

The fundamental waveform correlation unit 102 derives a correlation in a time domain between the received multicarrier signal and the synchronization signal replica including the three different sequences supplied from the synchronization signal replica generation unit 104. Then, the fundamental waveform correlation unit 102 supplies the correlation value between the received multicarrier signal and the synchronization signal replica and supplies the derived correlation value to the symbol timing detection unit 106.

The symbol timing detection unit 106 detects a SCH symbol timing and a P-SCH sequence number based on the correlation value supplied from the fundamental waveform correlation unit 102. For example, the symbol timing detection unit 106 may detect a symbol timing having the maximum correlation value. Then, the symbol timing detection unit 106 supplies the detected SCH symbol timing and P-SCH sequence number together with the incoming correlation value to the P-SCH sequence number detection unit 108.

The P-SCH sequence number detection unit 108 detects a cell number of a camped cell of the user equipment 100ₙ based on the incoming P-SCH sequence number from the symbol timing detection unit 106. Then, the P-SCH sequence number detection unit 108 supplies the detected cell number and the scramble sequence multiplied S-SCH sequence together with the incoming correlation value to the symbol timing candidate and P-SCH sequence number candidate selection unit 110.

The symbol timing candidate and P-SCH sequence number candidate selection unit 110 detects the SCH symbol timing and the P-SCH sequence number based on the incoming correlation value. For example, the symbol timing candidate and P-SCH sequence number candidate selection unit 110 may find a symbol timing having a correlation value greater than or equal to a correlation value less than or equal to X dB as a threshold from correlation values at the symbol timings detected in the symbol timing detection unit 106. Multiple symbol timings may be found. In the case where the user equipment performs initial cell search, the threshold may be determined depending on adjacent cell search. Also, the threshold may be determined depending on whether a base station apparatus transmitting the synchronization channel is in inter-base station synchronization. Then, the symbol timing candidate and P-SCH sequence number candidate selection unit 110 finds the P-SCH sequence number at the symbol timing. Then, the symbol timing candidate and P-SCH sequence number candidate selection unit 110 selects the detected SCH symbol timing and the detected P-SCH sequence number as a SCH symbol timing candidate and a P-SCH sequence number candidate, respectively. Then, the symbol timing candidate and P-SCH sequence number candidate selection unit 110 provides the S-SCH correlation unit 112 with the cell number detected in the P-SCH sequence number detection unit 108, the scramble sequence multiplied S-SCH sequence, the SCH symbol timing candidate and the P-SCH sequence number candidate.

The S-SCH correlation unit 112 derives a correlation between the scramble sequence multiplied S-SCH sequence and the cell ID group based on the symbol timing and the P-SCH sequence number supplied from the symbol timing detection unit 106 and the P-SCH sequence number detection unit 108. For example, the S-SCH correlation unit 112 uses the SCH symbol timing detected in the symbol timing detection unit 106 to extract subcarrier components by performing a FFT operation on the S-SCH sequence. Then, the S-SCH correlation unit 112 detects a cell ID group and a radio frame timing from the S-SCH sequence. Also, for example, the S-SCH correlation unit 112 uses the SCH symbol timing candidates detected in the symbol timing candidate and P-SCH sequence number candidate selection unit 110 to extract subcarrier components by performing the FFT operation on the S-SCH sequence. Then, the S-SCH correlation unit 112 detects the cell ID group and the radio frame timing from the S-SCH sequence. Cells within the same base station belong to the same cell ID group. In the case where a P-SCH specific scramble sequence is multiplied with the S-SCH sequence, the cell numbers within the same base station become known through detection of the P-SCH sequence. For example, the S-SCH correlation unit 112 finds a correlation in the frequency axis direction between the scramble sequence multiplied S-SCH sequence and the cell ID group.

The S-SCH detection unit 114 detects the S-SCH based on a correlation detection result of the S-SCH correlation unit 112. For example, the S-SCH detection unit 114 detects the S-SCH corresponding to the maximum correlation value based on the correlation detection result of the S-SCH correlation unit 112. For example, the S-SCH detection unit 114 detects the S-SCH among multiple S-SCH sequence determined based on the cell ID group and the radio frame timing. Specifically, in the case where there are 168 types of cell ID groups and two types of radio frame timings, the S-SCH is detected among 336 (=168×2) types of S-SCHs.

Also, in the case where the cell numbers within the same base station, which become known as a result of detection of the P-SCH sequence, are not taken into account, for example, the S-SCH detection unit 114 may detect the S-SCH among multiple S-SCH sequences determined based on the cell ID group, the radio frame timing and the P-SCH specific scramble. Specifically, if there are 168 types of cell ID groups, two types of radio frame timing and three types of P-SCH specific scrambles, the S-SCH is detected among 1008 (=168×2×3) types of S-SCHs. In addition, the S-SCH may be detected among multiple S-SCH sequences determined based on a second short code scramble sequence specific to the first short code. In this case, if there are X types of S-SCH sequences determined based on the second short code scramble sequence specific to the first short codes (X is an arbitrary integer between 2 and 31), the S-SCH is detected among (168×2×3×X=1008×X) types of S-SCHs.

Upon detection of the P-SCH and the S-SCH sequence, the user equipment $100_n$ detects the cell ID group.

The verification unit 116 detects the S-SCH sequence at the SCH symbol timing detected in the symbol timing detection unit 106 and the SCH symbol timing candidate detected in the symbol timing candidate and P-SCH sequence number candidate selection unit 110. For example, the verification unit 116 finds a correlation between the scramble sequence multiplied S-SCH sequence and the cell ID group. For example, the verification unit 116 uses the SCH symbol timing detected in the symbol timing detection unit 106 and the SCH symbol timing candidate detected in the symbol timing candidate and P-SCH sequence number candidate selection unit 110 to find the correlation between the scramble sequence multiplied S-SCH sequence and the cell ID group.

Then, the verification unit 116 detects the S-SCH sequence having the maximum correlation among the S-SCH correlation results for the S-SCH symbol timing and the SCH symbol timing candidate. As stated above, the S-SCH sequence includes the cell ID group and the radio frame timing. Then, the verification unit 116 determines whether the detected S-SCH sequence matches the detection result of the S-SCH detection unit 114. If the detected S-SCH sequence matches the detection result of the S-SCH detection unit 114, the verification unit 116 determines that the cell search is successful and sets the result indicated by the S-SCH detected in the S-SCH detection unit 114 as the cell ID group and the radio frame timing for the target cell. Also if it is determined that the cell search is successful, the communication continues.

On the other hand, if the detected S-SCH sequence does not match the detection result of the S-SCH detection unit 114, the verification unit 116 may set the result indicated by the S-SCH detected in the verification unit 116 as the cell ID group and the radio frame timing for the target cell. In this case, the verification unit 116 may determine that the cell search is not successful and retry the cell search from the first stage or the second stage. Here, the first stage cell search means a correlation detection operation in the fundamental waveform correlation unit 102 between the received multi-carrier signal and the synchronization signal replica consisting of three different sequences supplied from the synchronization signal replica generation unit 104. Also, the second stage cell search means an operation to find the correlation in the S-SCH correlation unit 112 between the scramble sequence multiplied S-SCH sequence supplied from the symbol timing candidate and P-SCH sequence number candidate selection unit 110 and the cell ID group.

It is described in detail below.

The cell search is performed based on the P-SCH and the S-SCH in a downlink signal. The cell search is performed based on the P-SCH sequence and the S-SCH sequence defined in the radio communication system 1000 as stated above. Specifically, the P-SCH sequence and the S-SCH sequence are detected to detect the cell ID or the cell ID group. After detection of the cell ID, a scramble code associated with the cell ID is used to receive broadcast information such as a primary broadcast channel, and the cell search may be ended. Details of the P-SCH sequence and the synchronization signal transmission pattern defined in the radio communication system 1000 are not repeatedly described as the description is the same as those for the base station apparatus $200_m$.

For example, if the radio communication system 1000 defines the synchronization signal transmission pattern described with reference to FIG. 8 and the P-SCH sequence number is associated with the cell ID information beforehand, the symbol timing detection unit 106 detects the synchronization channel timing and the P-SCH sequence number. Also, the S-SCH detection unit 114 performs descrambling with the S-SCH sequence multiplied scramble sequence to detect an information element in the S-SCH, whereby the cell specific information can be detected.

[Transmission and Reception of Synchronization Channel]

Next, a synchronization channel transmission method according to this embodiment is described.

The S-SCH generation unit 254 selects multiple synchronization signal sequences. For example, the S-SCH generation unit 254 selects two types of sequences, a sequence in sequence length 32 including 16 short codes (first layer cell ID group indicator #1) and a sequence in sequence length 32 including 16 short codes (second layer cell ID group indicator #2). Then, the S-SCH generation unit 254 may generate prior information to be transmitted to a mobile station beforehand. For example, the S-SCH generation unit 254 may generate the prior information indicative of the first layer cell ID group as a portion of cell ID group identification information. If the prior information is generated, the prior information is transmitted.

Also, the S-SCH generation unit 254 generates a secondary synchronization channel based on selected multiple synchronization signal sequences. For example, the S-SCH generation unit 254 generates the secondary synchronization channel indicative of a secondary layer cell ID group as a portion of the cell ID group identification information together with the first layer cell ID group as a portion of the cell ID group identification information. The synchronization signal control unit $209_1$ supplies information indicative of a scramble sequence to the scramble sequence generation unit 258. For example, the synchronization signal control unit $209_1$ supplies information indicative of a common scramble code over all cells to the scramble sequence generation unit 258. Also, for example, the synchronization control unit $209_1$ supplies information indicative of multiple types of scramble codes to the scramble sequence generation unit 258. In the multiplier 256, the secondary synchronization channel is multiplied with the scramble sequence generated in the scramble sequence generation unit, and the multiplied sequence is transmitted.

A mobile station detects the cell specific information based on the prior information and the secondary synchronization channel.

[First Operation of Mobile Station]

Figure 13:
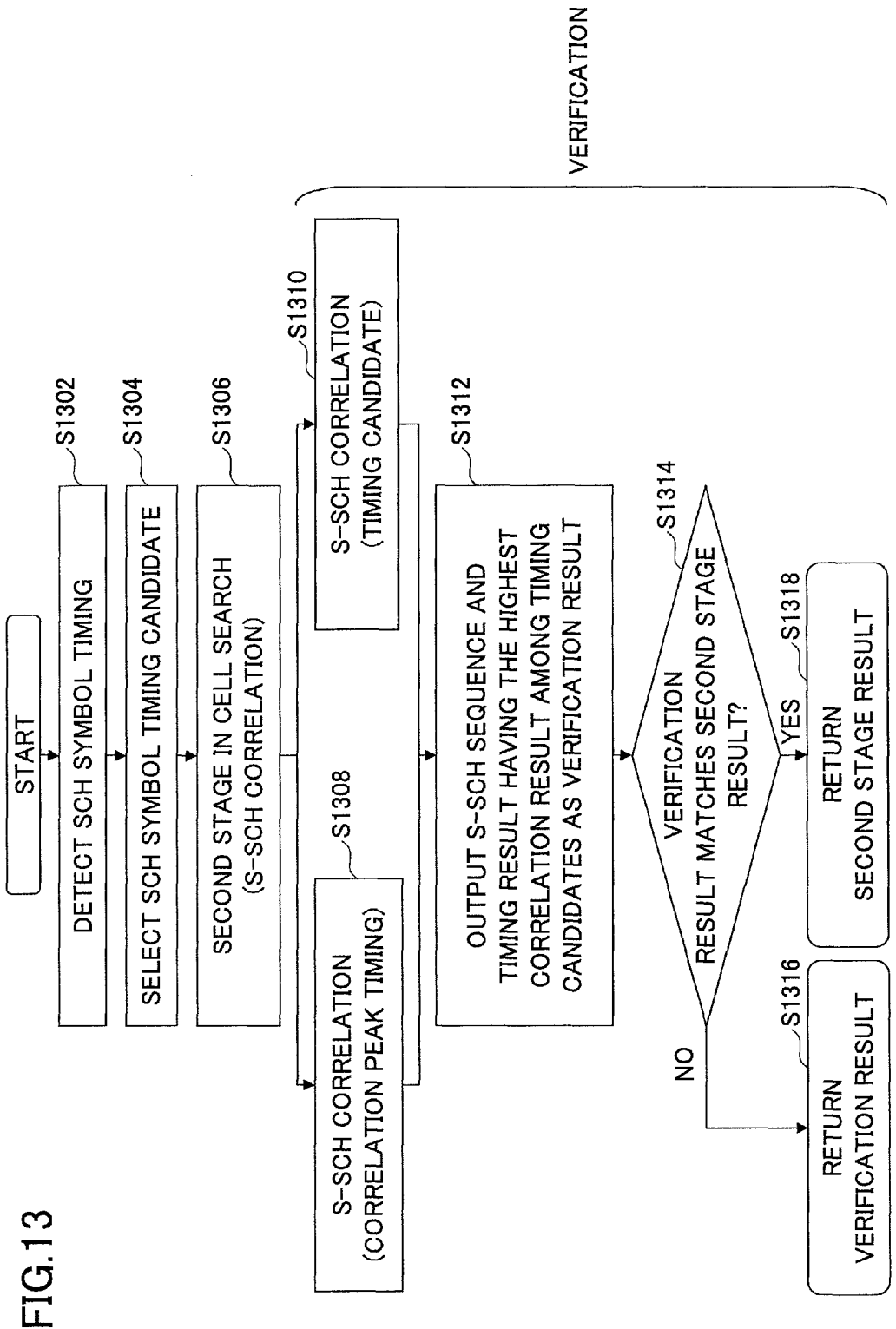
FIG. 13 is a flow diagram illustrating an operation of the user equipment according to one embodiment.

Next, a cell search method in the radio communication system 1000 according to this embodiment is described with reference to FIG. 13.

The mobile station $100_n$ detects a SCH symbol timing (step S1302). For example, the fundamental waveform correlation unit 102 detects a correlation in a time domain between a P-SCH replica signal and a received signal to determine a carrier frequency and a timing for the P-SCH. Then, the symbol timing detection unit 106 detects a SCH symbol timing and a P-SCH sequence based on the detected correlation result. For example, the symbol timing detection unit 106 detects a correlation between a received multicarrier signal and a P-SCH replica signal consisting of three different sequences. Upon detection of a P-SCH sequence number, the mobile station $100_n$ selects a SCH symbol timing candidate (step S1304). For example, the symbol timing candidate and P-SCH sequence number candidate selection unit 110 selects the P-SCH sequence number and reception timing having a correlation value greater than or equal to a correlation value less than or equal to X dB from the maximum correlation value as the SCH symbol timing candidate and the P-SCH sequence candidate for the correlation result between the received signal and the P-SCH replica signal.

The mobile station $100_n$ performs the second stage cell search (step S1306). For example, the S-SCH correlation unit 112 performs a FFT operation on the S-SCH by using the SCH symbol timing with the maximum correlation value detected in the symbol timing detection unit 106 and extracts individual subcarrier components. Then, the S-SCH detection unit 114 detects a cell ID group and a radio frame timing from the S-SCH sequence. If the symbol timing, the carrier frequency and the P-SCH sequence number are identified for the P-SCH, the reception timing and the and the carrier frequency can be determined for the S-SCH. The scramble sequence multiplied S-SCH is descrambled. The radio frame timing is detected from the cell specific S-SCH sequence for the S-SCH. Typically, multiple SCHs (e.g., two SCHs) are arranged in one radio frame, the frame timing must be detected after the timing detection. Also, the cell ID group is detected from the cell specific S-SCH sequence.

Here, a smaller number of specific information candidates have to be detected by indicating all or a portion of the cell ID groups to a mobile station as the prior information, which can improve detection accuracy. As a result, it is possible to improve the characteristics. For example, the radio frame timing or the transmit antenna quantity information may be indicated as the prior information.

In the case where a base station has multiple transmit antennas, the base station may indicate the transmit antenna quantity information to a mobile station, which may detect the transmit antenna quantity information (MIMO (Multiple Input Multiple Output) antenna quality information) at the second step. Particularly, the base station may detect the transmit antenna quantity information to transmit a broadcast channel. Then, the cell ID is detected by using the cell ID group detected at the second step and the primary synchronization channel sequence number detected at the first step. A scramble code associated with the detected cell ID may be used to receive broadcast information such as a primary broadcast channel.

The mobile station $100_n$ performs a verification operation.

The mobile station $100_n$ detects a S-SCH sequence for the SCH symbol timing detected at step S1302 and the SCH symbol timing candidate detected at step S1304 (steps S1308 and S1310). For example, the verification unit 116 detects the S-SCH sequence for the SCH symbol timing detected at step S1302 and the SCH symbol timing candidate detected at step S1304. Although the single SCH symbol timing candidate is illustrated in FIG. 13, two or more SCH symbol timing candidates may be detected.

The mobile station $100_n$ finds a S-SCH sequence having the maximum correlation in the frequency direction at multiple timing candidates and the timing result as the verification result (step S1312). For example, the verification unit 116 finds the S-SCH sequence having the maximum correlation and the timing result based on a detection result of the S-SCH sequence.

The mobile station $100_n$ determines whether the S-SCH sequence and the timing result found at step S1312 match the cell ID group and the radio frame timing detected at step S1306 (step S1314). For example, the verification unit 116 determines whether the found S-SCH sequence and timing result match the S-SCH sequence detected in the S-SCH detection unit 114.

If the S-SCH sequence and timing result found at step S1312 match the cell ID group and the radio frame timing detected at step S1306 (step S1314: YES), the mobile station $100_n$ returns a result of the second stage cell search (step S1318). For example, if the found S-SCH sequence and timing result match the S-SCH sequence detected in the S-SCH detection unit 114, the verification unit 116 outputs the S-SCH sequence detected in the S-SCH detection unit 114. In this case, it is determined that the cell search is successful, and the communication continues.

On the other hand, if the S-SCH sequence and timing result found at step S1312 do not match the cell ID group and the radio frame timing detected at step S1306 (step S1314: NO), the mobile station $100_n$ returns a verification result (step S1316). For example, if the found S-SCH sequence and timing result do not match the S-SCH sequence detected in the S-SCH detection unit 114, the verification unit 116 outputs the S-SCH sequence derived in itself. In this case, it is determined that the cell search is not successful. In this case, previous operations may be performed by using the found S-SCH sequence and timing result. Also in this case, the cell search may be retried from the first stage or the second stage.

In the above-mentioned embodiment, it is described that the symbol timing candidate and P-SCH sequence number candidate selection unit 110 selects the reception timing and the P-SCH sequence number having a correlation value greater than or equal to correlation values less than or equal to X dB from the maximum correlation value as the SCH symbol timing candidate and the P-SCH sequence candidate, but the operation may be as follows. For example, the symbol timing candidate and P-SCH sequence number candidate selection unit 110 may select a predefined number of reception timings and P-SCVH sequence numbers as the S-SCH symbol timing candidate and the P-SCH sequence candidate among correlation values greater than or equal to the correlation values less than or equal to X dB from the correlation peak. For example, the symbol timing candidate and P-SCH sequence number candidate selection unit 110 may select reception timings and P-SCH sequence numbers having the highest Y correlation values as the SCH symbol timing candidate and the P-SCH sequence candidate.

Figure 14:
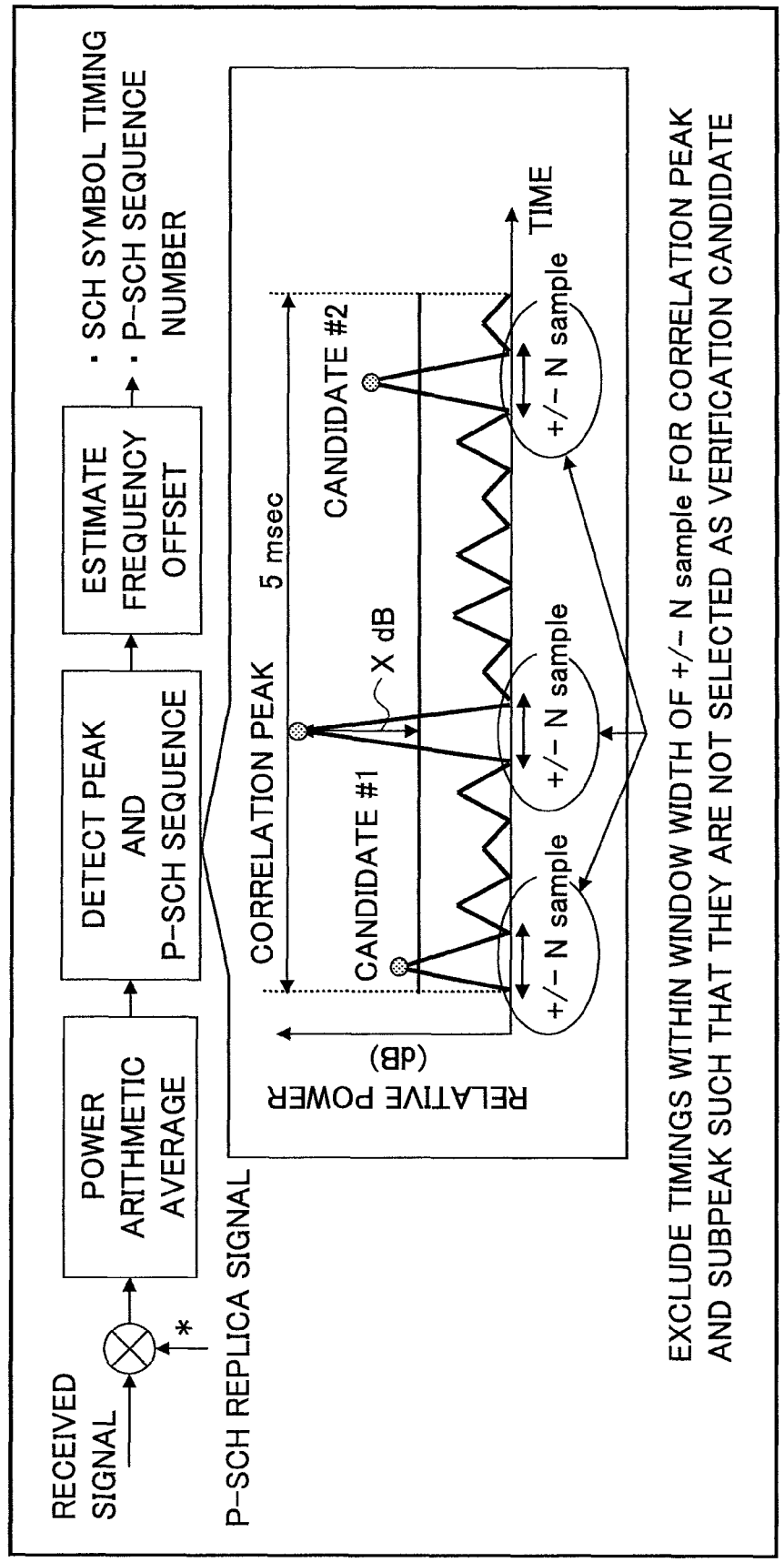
FIG. 14 is a flow diagram illustrating an operation of the user equipment according to one embodiment.

Also, for example, the symbol timing candidate and P-SCH sequence number candidate selection unit 110 may exclude N samples located at both sides of correlation peak timings exceeding a threshold from the SCH symbol timing candidate. For example, as illustrated in FIG. 14, if the SCH symbol timing and the P-SCH sequence number are found, the operation may be as follows. A power arithmetic average of correlation signals between received signals and P-SCH replica signals is found. Then, the peak and the P-SCH sequence are detected based on the power arithmetic average. Then, a frequency offset is estimated to find the SCH symbol timing and the P-SCH sequence number. In the case where the peak and the P-SCH sequence are detected, for the SCH symbol timing candidate, N samples located at both sides of the SCH symbol timing are excluded from the SCH symbol timing candidate. Also, N samples located at both sides of the SCH symbol timing may be excluded from the SCH symbol timing candidate. For example, this exclusion may be made based on a delay profile. In this manner, even if synchronization signals after the second pass arrive due to influence of multipass, the influence of the second pass and subsequent passes can be reduced.

Also, in the case where the S-SCH sequence is detected for the SCH symbol timing and the SCH symbol timing candidate, the verification unit 116 may find an in-phase arithmetic average of correlation signals derived at the second stage cell search.

[Second Operation of Mobile Station]

The present cell search is described with reference to FIG. 15.

In this cell search, steps S1502 and S1504 are the same as the above-mentioned steps S1302 and S1304. Also in the present cell search, steps S1514 through S1520 are the same as the above-mentioned steps S1312 through S1318.

The mobile station $100_n$ performs the second stage cell search (step S1506). For example, the S-SCH correlation unit 112 uses a SCH symbol timing corresponding to the maximum correlation value detected in the symbol timing detection unit 106 to perform a FFT operation on a S-SCH and extracts individual subcarrier components. Then, the S-SCH detection unit 114 detects a cell ID group and a radio frame timing from the S-SCH sequence.

The mobile station performs the second stage cell search (step S1508). For example, the S-SCH correlation unit uses a SCH symbol timing candidate selected in the symbol timing candidate and P-SCH sequence number candidate selection unit 110 to perform the FFT operation on the S-SCH and extracts the individual subcarrier components. Then, the S-SCH detection unit 114 detects the cell ID group and the radio frame timing from the S-SCH sequence.

The mobile station $100_n$ detects a S-SCH sequence for the SCH symbol timing candidate detected at step S1504 (step S1512). For example, the verification unit 116 detects a correlation between the S-SCH and the SCH symbol timing candidate selected at step S1504. In this case, the verification unit 116 calculates an in-phase arithmetic average for the correlation signal derived at step S1510.

Figure 15:
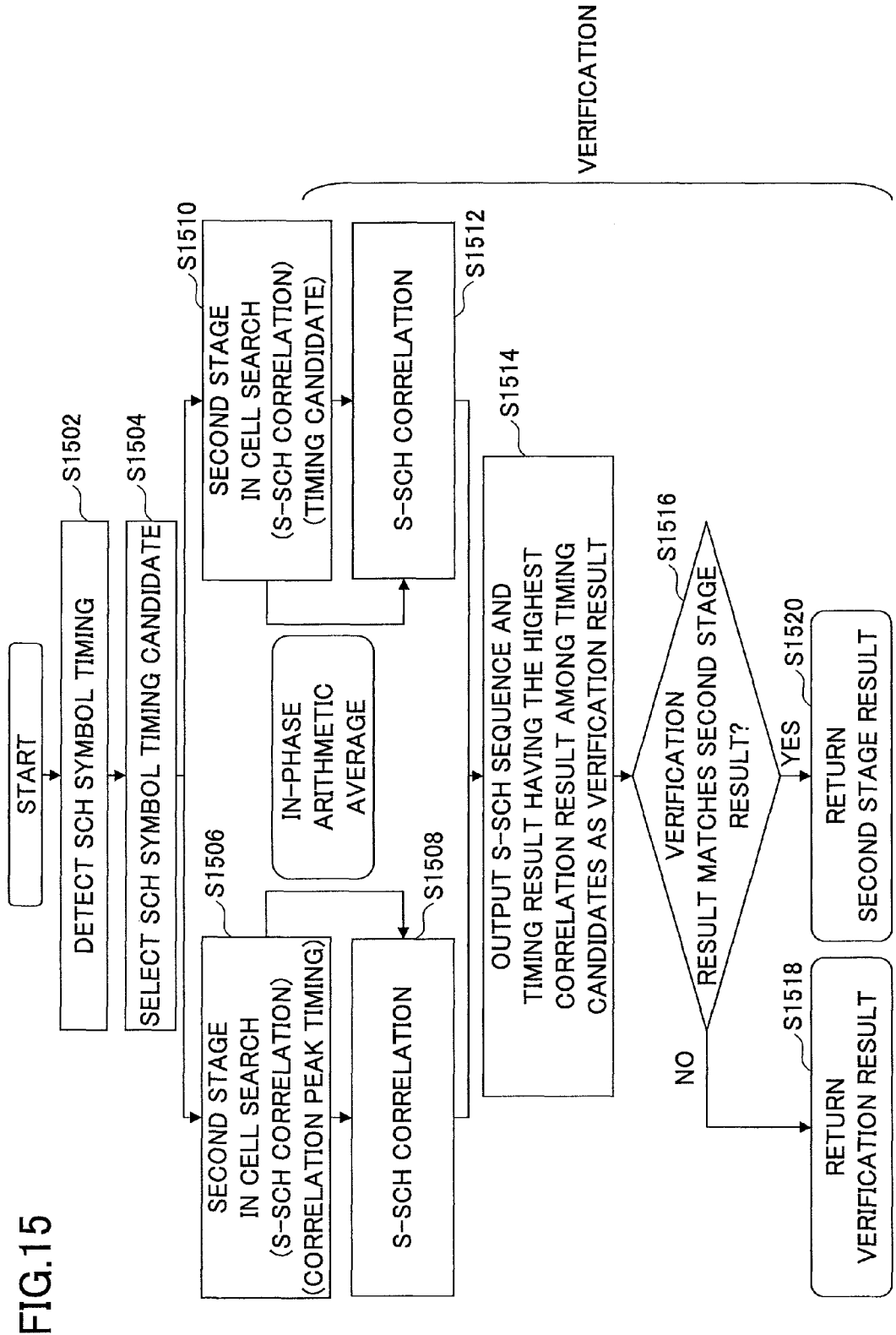
FIG. 15 is a flow diagram illustrating an operation of the user equipment according to one embodiment.

Although one SCH symbol timing candidate is illustrated in FIG. 15, two or more SCH symbol timing candidates may be present.

The mobile station $100_n$ calculates a S-SCH sequence and timing result having the maximum correlation result among multiple timing candidates as a verification result (step S1514). For example, the verification unit 116 calculates the S-SCH sequence and timing result having the maximum correlation result based on the correlation result of the S-SCH sequence.

[Third Operation of Mobile Station]

Also, the S-SCH sequence candidate may be reduced during the verification in the second stage cell search. For example, the verification unit 116 may reduce the S-SCH sequence candidate based on a threshold for reducing the S-SCH sequence candidate. Specifically, the verification unit 116 may focus on the S-SCH having a correlation value greater than or equal to a correlation value less than or equal to a threshold Z dB from the correlation peak. In the case where the user equipment performs initial cell search, the threshold may be determined depending on neighbor cell search cases. Also, the threshold may be determined depending on whether the base station apparatus transmitting the SCH is in inter-base station synchronization. Also, the S-SCH corresponding to the highest V correlation values may be focused on in correlation values greater than or equal to correlation values less than or equal to the threshold Z dB from the correlation peak.

A cell search method for that case is described with reference to FIG. 16. In this cell search, steps S1608 and S1614 are utilized in the cell search method described with reference to FIG. 15.

The mobile station performs the second stage cell search (step S1606). For example, the S-SCH correlation unit 112 uses a SCH symbol timing having the maximum correlation value detected in the symbol timing detection unit 106 to perform a FFT operation and extracts individual subcarrier components. Then, the S-SCH detection unit 114 detects a cell ID group and a radio frame timing from the S-SCH sequence.

The mobile station $100_n$ selects a S-SCH sequence candidate (step S1608). For example, the S-SCH detection unit 114 may select a correlation value greater than or equal to a correlation value less than or equal to a threshold Z dB from the correlation peak based on the S-SCH correlation. Also, the S-SCH detection unit 114 may select the S-SCH sequence corresponding to the highest V correlation values in the correlation values greater than or equal to the correlation values less than or equal to the threshold Z dB from the correlation peak.

The mobile station $100_n$ detects a S-SCH sequence for the SCH symbol timing detected at step S1602 (step S1610). For example, the verification unit 116 detects the S-SCH sequence for the SCH symbol timing detected at step S1602. In this case, the verification unit 116 uses an in-phase arithmetic average for correlation signals in the S-SCH sequence selected at step S1608.

The mobile station $100_n$ performs the second stage cell search (step S1612). For example, the S-SCH correlation unit 112 uses the SCH symbol timing selected in the symbol timing candidate and P-SCH sequence number candidate selection unit 110 to perform a FFT operation and extracts individual subcarrier components. Then, the S-SCH detection unit 114 detects a cell ID group and a radio frame timing from the S-SCH sequence.

The mobile station $100_n$ selects a S-SCH sequence candidate (step S1614). For example, the S-SCH detection unit 114 may select a correlation value greater than or equal to a correlation value less than or equal to the threshold Z dB from the peak correlation based on the S-SCH correlation. Also, the S-SCH detection unit 114 may select the S-SCH sequence corresponding to the highest V correlation values in the correlation values greater than or equal to correlation values less than or equal to the threshold Z dB from the peak correlation.

The mobile station $100_n$ detect the S-SCH sequence for the SCH symbol timing candidate detected at step S1604 (step S1616). For example, the verification unit 116 detects the S-SCH sequence for the SCH symbol timing candidate detected at step S1604. In this case, the verification unit 116 uses an in-phase arithmetic average for correlation signals in the S-SCH sequence candidates selected at step S1614.

The mobile station $100_n$ calculates a S-SCH sequence and timing result having the maximum correlation result among multiple timing candidates as a verification result (step S1618). For example, the verification unit 116 calculates the S-SCH sequence and timing result having the maximum correlation result based on the correlation result of the S-SCH sequence.

In this embodiment, multiple SCH symbol timing candidates are detected from the SCH, and the S-SCH correlation is determined based on the multiple SCH symbol timing candidates. In other embodiments, the SCH symbol timing candidates are detected from the SCH, and multiple S-SCH candidates may be determined through S-SCH correlation detection based on the SCH symbol timing candidates. In this manner, it is possible to improve the S-SCH detection accuracy.

In the above-mentioned embodiment, the verification may be performed multiple times.

In the above-mentioned embodiment, the S-SCH correlation may be calculated for the SCH symbol timing candidate in the verification. In this manner, it is possible to reduce an amount of time required to calculate the S-SCH correlation for the SCH symbol timing. In this case, a correlation value calculated at the second stage cell search may be used for the S-SCH correlation for the SCH symbol timing.

In the above-mentioned embodiment, the calculation of the S-SCH correlation may be made in a parallel or serial fashion in the verification. In the parallel calculation case, multiple correlators are required, but the processing time can be shortened. On the other hand, in the serial calculation case, a relatively long processing time may be required, but only one correlator is needed.

In this embodiment, multiple SCH symbol timing candidates are detected from the SCH, and thus even if the most probable SCH symbol timing in the multiple SCH symbol timing candidates corresponds to false detection, the cell search does not have to be retried from the beginning, which can shorten the cell search time. Also, it is possible to reduce reception workload of the SCH required for the case where the cell search is retried from the beginning.

Also in this embodiment, the S-SCH correlation is detected based on the SCH symbol timing having the maximum correlation value for the P-SCH replica signal. Then, if the S-SCH correlation value detected based on the SCH symbol timing having the maximum correlation value for the P-SCH replica signal is greater than or equal to the S-SCH correlation value detected based on the SCH symbol timing candidate, the S-SCH is detected based on the SCH symbol timing. In this manner, the verification in the cell search can be made. Also, it is possible to improve the cell search accuracy.

Also in this embodiment, if the S-SCH correlation value detected based on the SCH symbol timing having the maximum correlation value for the P-SCH replica signal is less than or equal to the S-SCH correlation value detected based on the SCH symbol timing candidate, the S-SCH is detected based on the SCH symbol timing candidate. In this manner, the verification in the cell search can be made.

Also in this embodiment, in the case where the S-SCH correlation is detected based on the SCH symbol timing and the SCH symbol timing candidate, the in-phase arithmetic average of the correlation signal is calculated. In this manner, it is possible to reduce the influence of noise in the correlation signal.

Also in this embodiment, in the case where the S-SCH correlation is detected based on the SCH symbol timing and the SCH symbol timing candidate, the S-SCH candidate is determined based on the S-SCH correlation value, and the in-phase arithmetic average of the correlation signal is calculated based on the selected S-SCH candidate. In this manner, it is possible to narrow the S-SCH.

Also in this embodiment, in the case where multiple P-SCH candidate are detected, the symbol timing is detected by excluding the peak having maximum correlation value and a predefined number of peaks before and after the peak having a correlation value greater than or equal to a correlation value less than or equal to a predefined threshold from the maximum correlation value. In this manner, even if multiple paths arrive due to influence of multipath, it is possible to reduce the influence.

Also in this embodiment, the S-SCH correlation is detected based on the SCH symbol timing candidate to detect multiple S-SCH candidates, and the S-SCH is detected based on the multiple S-SCH candidates. In this manner, even if the most probable S-SCH in the multiple S-SCH candidates corresponds to false detection, the cell search does not have to be retried from the beginning, which can shorten the cell search time. Also, it is possible to reduce SCH reception workload required for the case where the cell search is retried from the beginning.

Although the Evolved UTRA and UTRAN (also referred to as Long Term Evolution or Super 3G) applied system has been illustratively described in the above embodiments, the user equipment and the cell search method according to the present invention can be applied to all systems using the OFDM scheme in downlink. Also, the user equipment and the cell search method can be applied to a radio communication system where the SCH including the P-SCH and the S-SCH is utilized. For example, the user equipment and the cell search method can be applied to a future mobile communication system such as an IMT-Advanced. The IMT-Advanced is also referred to as a LTE-Advanced in 3GPP ($3^{rd}$ Generation Partnership Project).

For convenience, the present invention has been described using specific numerals in order to facilitate understandings of the present invention, but unless specifically stated otherwise, these numerals are simply illustrative, and any other appropriate value may be used.

Although the present invention has been described with reference to specific embodiments, these embodiments are simply illustrative, and various variations, modifications, alterations, substitutions and so on could be conceived by those skilled in the art. For convenience, apparatuses according to the embodiments of the present invention have been described with reference to functional block diagrams, but the apparatuses may be implemented in hardware, software or combinations thereof. The present invention is not limited to the above-mentioned embodiment and is intended to include various variations, modifications, alterations, substitutions and so on without departing from the spirit of the present invention This international patent application is based on Japanese Priority Application No. 2008-207484 filed on Aug. 11, 2008, the entire contents of which are hereby incorporated by reference.

LIST OF REFERENCE SYMBOLS $50_k$ ($50_1$, $50_2$, $50_3$): cell
$100_n$ ($100_1$, $100_2$, $100_3$, $100_4$, $100_5$): user equipment
102: fundamental waveform correlation unit
104: SCH replica generation unit
106: symbol timing detection unit
108: P-SCH sequence number detection unit
110: symbol timing candidate and P-SCH sequence number candidate selection unit
112: S-SCH correlation unit
114: S-SCH detection unit
116: verification unit
116: reference signal error detection unit
$200_m$ ($200_1$, $200_2$, $200_3$): base station apparatus
202: transmit and receive antenna
204: amplification unit
206: transmitting and receiving unit
208: baseband signal processing unit
209: synchronization signal generation unit
210: call processing unit
212: channel interface
$208_1$: RLC processing unit
$208_2$: MAC control processing unit
$208_3$: encoding unit
$208_4$: data modulation unit
$208_5$: multiplexing unit
$208_6$: serial to parallel conversion unit
$208_7$: multipliers
$208_8$: multipliers
$208_9$: scramble code generation unit
$208_{10}$: amplitude adjustment unit
$208_{11}$: combination unit
$208_{12}$: inverse Fourier transform unit
$208_{13}$: CP addition unit
$209_1$: synchronization signal control unit
$209_2$: synchronization signal generation unit
$209_3$: data modulation unit
$209_4$: serial to parallel conversion unit
$209_5$: multipliers
$209_6$: amplitude adjustment unit
252: P-SCH generation unit
254: S-SCH generation unit
256: scramble code sequence generation unit
260: multiplexing unit
300: access gateway apparatus
400: core network
1000: radio communication system

The invention claimed is:

1. A user equipment for performing cell search using a synchronization channel including a primary synchronization channel and a secondary synchronization channel, comprising:
a reception unit configured to receive a signal including the synchronization channel;
a symbol timing candidate detection unit configured to detect multiple synchronization signal symbol timing candidates from the synchronization channel based on a correlation value in a time domain between the signal received at the reception unit and a replica signal of the primary synchronization channel;
a secondary synchronization channel correlation detection unit configured to perform correlation detection for the secondary synchronization channel based on the multiple synchronization signal symbol timing candidates detected in the symbol timing candidate detection unit; and
a secondary synchronization channel detection unit configured to detect the secondary synchronization channel based on a result of the correlation detection by the secondary synchronization channel correlation detection unit.

2. The user equipment as claimed in claim 1, wherein
the multiple synchronization signal symbol timing candidates detected in the symbol timing candidate detection unit includes a primary synchronization channel symbol timing having the maximum correlation value,
the secondary synchronization channel correlation detection unit detects a correlation value for the secondary synchronization channel based on the primary synchronization channel symbol timing, and
if the correlation value for the secondary synchronization channel detected based on the primary synchronization channel symbol timing is greater than or equal to the correlation value for the secondary synchronization channel detected based on the multiple synchronization channel symbol timing candidates, the secondary synchronization channel detection unit outputs the secondary synchronization channel detected based on the primary synchronization channel symbol timing.

3. The user equipment as claimed in claim 2, wherein if the correlation value for the secondary synchronization channel is detected based on the primary synchronization channel symbol timing and the multiple synchronization channel symbol timing candidates, the secondary synchronization channel correlation detection unit calculates an in-phase arithmetic average for a correlation signal.

4. The user equipment as claimed in claim 2, wherein if the correlation value for the secondary synchronization channel is detected based on the primary synchronization channel symbol timing and the multiple synchronization channel symbol timing candidates, the secondary synchronization channel correlation detection unit selects a secondary synchronization channel candidate based on the correlation value for the secondary synchronization channel and calculates an in-phase arithmetic average for a correlation signal for the secondary synchronization channel.

5. The user equipment as claimed in claim 1, wherein
the multiple synchronization signal symbol timing candidates detected in the symbol timing candidate detection unit includes a primary synchronization channel symbol timing having the maximum correlation value,
the secondary synchronization channel correlation detection unit detects a correlation value for the secondary synchronization channel based on the primary synchronization channel symbol timing, and
if the correlation value for the secondary synchronization channel detected based on the primary synchronization channel symbol timing is less than the correlation value for the secondary synchronization channel detected based on the multiple synchronization channel symbol timing candidates, the secondary synchronization channel detection unit outputs the secondary synchronization channel detected based on the correlation value for the secondary synchronization channel detected based on the multiple synchronization channel symbol timing candidates.

6. The user equipment as claimed in claim 1, wherein the symbol timing candidate detection unit detects a symbol timing having a correlation value greater than or equal to a correlation value less than or equal to a predefined threshold from the maximum correlation value.

7. The user equipment as claimed in claim 6, wherein the symbol timing candidate detection unit sets the predefined threshold depending on which the user equipment performs an initial cell search or a neighbor cell search.

8. The user equipment as claimed in claim 6, wherein the symbol timing candidate detection unit sets the predefined threshold depending on whether a base station apparatus transmitting the synchronization signal is in inter-base station synchronization.

9. The user equipment as claimed in claim 1, wherein the symbol timing candidate detection unit detects a predefined number of symbol timings.

10. The user equipment as claimed in claim 1, wherein the symbol timing candidate detection unit excludes a peak having the maximum correlation value and a predefined number of timings before and after a timing having a correlation value greater than or equal to a correlation value less than or equal to a predefined threshold from the maximum correlation value to detect the symbol timing.

11. A user equipment for performing cell search using a synchronization channel including a primary synchronization channel and a secondary synchronization channel, comprising:
a reception unit configured to receive a signal including the synchronization channel;
a symbol timing candidate detection unit configured to detect a synchronization signal symbol timing candidate from the synchronization channel based on a correlation value in a time domain between the signal received at the reception unit and a replica signal of the primary synchronization channel;
a secondary synchronization channel correlation detection unit configured to perform correlation detection for the secondary synchronization channel based on the synchronization signal symbol timing candidate detected in the symbol timing candidate detection unit to detect multiple secondary synchronization channel candidates; and
a secondary synchronization channel detection unit configured to detect the secondary synchronization channel based on the multiple secondary synchronization channel candidates detected in the secondary synchronization channel correlation detection unit.

12. The user equipment as claimed in claim 11, wherein
the multiple secondary synchronization channel candidates detected in the secondary synchronization channel correlation detection unit includes a first secondary synchronization channel having the maximum correlation value,
the secondary synchronization channel correlation detection unit detects a correlation value based on the first secondary synchronization channel, and
if the correlation value detected based on the first secondary synchronization channel is greater than or equal to the correlation value detected based on the multiple secondary synchronization channel candidates, the secondary synchronization channel detection unit outputs the first secondary synchronization channel.

13. The user equipment as claimed in claim 11, wherein
the multiple secondary synchronization channel candidates detected in the secondary synchronization channel correlation detection unit include a first secondary synchronization channel having the maximum correlation value,
the secondary synchronization channel correlation detection unit detects a correlation value based on the first secondary synchronization channel, and
if the correlation value detected based on the first secondary synchronization channel is less than the correlation value detected based on the multiple secondary synchronization channel candidates, the secondary synchronization channel detection unit outputs the secondary synchronization channel detected based on the correlation value for the secondary synchronization channel detected based on the multiple secondary synchronization channel candidates.

14. The user equipment as claimed in claim 11, wherein if the correlation value for the secondary synchronization channel is detected based on the synchronization signal symbol timing candidates, the secondary synchronization channel correlation detection unit calculates an in-phase arithmetic average for a correlation signal.

15. The user equipment as claimed in claim 11, wherein if the correlation value for the secondary synchronization channel is detected based on the synchronization signal symbol timing candidate, the secondary synchronization channel correlation detection unit selects a predefined number of secondary synchronization signals based on the correlation value for the secondary synchronization channel and calculates an in-phase arithmetic average for a correlation signal for the predefined number of secondary synchronization channels.

16. The user equipment as claimed in claim 11, wherein the secondary synchronization channel correlation detection unit detects a secondary synchronization channel having a correlation value greater than or equal to a correlation value less than or equal to a predefined threshold from the maximum correlation value.

17. The user equipment as claimed in claim 16, wherein the secondary synchronization channel correlation detection unit sets the predefined threshold depending on which the user equipment performs an initial cell search or a neighbor cell search.

18. The user equipment as claimed in claim 16, wherein the secondary synchronization channel correlation detection unit sets the predefined threshold depending on whether a base station apparatus transmitting the synchronization signal is in inter-base station synchronization.

19. A cell search method in a user equipment for performing cell search using a synchronization channel including a primary synchronization channel and a secondary synchronization channel, the method comprising:
receiving a signal including the synchronization channel;
detecting multiple synchronization signal symbol timing candidates from the synchronization channel based on a correlation value in a time domain between the received signal and a replica signal of the primary synchronization channel;
performing correlation detection for the secondary synchronization channel based on the detected multiple synchronization signal symbol timing candidates; and
detecting the secondary synchronization channel based on a result of the correlation detection.

20. A cell search method in a user equipment for performing cell search using a synchronization channel including a primary synchronization channel and a secondary synchronization channel, the method comprising:
- receiving a signal including the synchronization channel;
- detecting a synchronization signal symbol timing candidate from the synchronization channel based on a correlation value in a time domain between the received signal and a replica signal of the primary synchronization channel;
- performing correlation detection for the secondary synchronization channel based on the detected synchronization signal symbol timing candidate to detect multiple secondary synchronization channel candidates; and
- detecting the secondary synchronization channel based on the detected multiple secondary synchronization channel candidates.

* * * * *